(12) United States Patent
Mayell et al.

(10) Patent No.: US 12,537,454 B2
(45) Date of Patent: Jan. 27, 2026

(54) CONTROL OF A RESONANT CONVERTER USING SWITCH PATHS DURING POWER-UP

(71) Applicant: POWER INTEGRATIONS, INC., San Jose, CA (US)

(72) Inventors: Robert J. Mayell, Los Altos, CA (US); Yueming Wang, Gilroy, CA (US); Hartley Fred Horwitz, Ottawa (CA); Paul Demone, Kanata (CA)

(73) Assignee: POWER INTEGRATIONS, INC., San Jose, CA (US)

( * ) Notice: Subject to any disclaimer, the term of this patent is extended or adjusted under 35 U.S.C. 154(b) by 591 days.

(21) Appl. No.: 17/783,618

(22) PCT Filed: Dec. 15, 2020

(86) PCT No.: PCT/US2020/065074
§ 371 (c)(1),
(2) Date: Jun. 8, 2022

(87) PCT Pub. No.: WO2021/126826
PCT Pub. Date: Jun. 24, 2021

(65) Prior Publication Data
US 2023/0010711 A1 Jan. 12, 2023

Related U.S. Application Data

(60) Provisional application No. 62/948,444, filed on Dec. 16, 2019.

(51) Int. Cl.
*H02M 3/335* (2006.01)
*H02M 1/00* (2007.01)
(Continued)

(52) U.S. Cl.
CPC ..... *H02M 3/33571* (2021.05); *H02M 1/0006* (2021.05); *H02M 1/08* (2013.01); *H02M 1/36* (2013.01); *H02M 3/01* (2021.05)

(58) Field of Classification Search
CPC ...... H02M 3/33571; H02M 3/01; H02M 1/36; H02M 1/08; H02M 1/0006
See application file for complete search history.

(56) References Cited

U.S. PATENT DOCUMENTS 10,181,804 B1 * 1/2019 Li ................ H02M 7/4807
2016/0013722 A1 * 1/2016 Adragna .......... H02M 3/33507
363/21.02

(Continued)

FOREIGN PATENT DOCUMENTS

| CN | 104756391 A | 7/2015 |
|---|---|---|
| CN | 105027376 A | 11/2015 |

(Continued)

OTHER PUBLICATIONS

PCT Application PCT/US2020/065074, Information on Search Strategy, Mar. 30, 2021, 1 page.

(Continued)

*Primary Examiner* — Jue Zhang
(74) *Attorney, Agent, or Firm* — Brian H. Floyd

(57) ABSTRACT

Control of a resonant power converter using switch paths during power-up is described herein. During power-up, a first switch path sinks current away from a resonant capacitor while a second switch path sources current to a high-side capacitor. In this way the high-side capacitor may predictably charge to sufficient bootstrap voltage for steady state operation. Additionally, a third switch path may control current to a low-side capacitor.

29 Claims, 11 Drawing Sheets

(51) Int. Cl.
    *H02M 1/08*     (2006.01)
    *H02M 1/36*     (2007.01)
    *H02M 3/00*     (2006.01)

(56) References Cited

U.S. PATENT DOCUMENTS

2016/0141951 A1*   5/2016   Mao ........................ H02M 1/36
                                                                                       363/21.02
2019/0097542 A1*   3/2019   Op Het Veld ...... H02M 3/3378

FOREIGN PATENT DOCUMENTS

| CN | 105245121 A | | 1/2016 | |
|---|---|---|---|---|
| CN | 105940453 A | * | 9/2016 | ............. H03K 17/08 |
| CN | 106602879 A | | 4/2017 | |
| WO | 2019032125 A1 | | 2/2019 | |

OTHER PUBLICATIONS

PCT Application PCT/US2020/065074, International Search Report, Mar. 30, 2021, 4 pages.
PCT Application PCT/US2020/065074, Written Opinion of the International Searching Authority, Mar. 30, 2021, 7 pages.
PCT Application PCT/US2020/065074, International Preliminary Report on Patentability, May 17, 2022, 8 pages.
Communication Pursuant to Article 94(3) EPC; European Application No. 20842075.2; mailed Apr. 5, 2023; 7 pages.
Communication Pursuant to Article 94(3) EPC; European Application No. 20842075.2; mailed Jan. 13, 2025; 7 pages.
Chinese Application Serial No. 202080087707.4, First Office Action with Search Report mailed Jun. 16, 2025 with Machine Translations, 15 pages.

* cited by examiner

CONTROL OF A RESONANT CONVERTER USING SWITCH PATHS DURING POWER-UP

CROSS-REFERENCE TO RELATED APPLICATIONS

This application is a National Stage Entry of International Application No. PCT/US2020/065074 filed on Dec. 15, 2020, which claims the benefit of U.S. Provisional Application No. 62/948,444 filed on Dec. 16, 2019, incorporated in their entirety herein by reference.

FIELD OF DISCLOSURE

The present disclosure relates generally to power converters, and more specifically to powering on resonant converters.

BACKGROUND INFORMATION

Electronic devices use power to operate. Switched mode power converters are commonly used due to their high efficiency, small size and low weight to power many of today's electronics. Conventional wall sockets provide a high voltage alternating current. In a switching power converter, a high voltage alternating current (ac) input is converted to provide a well-regulated direct current (dc) output through an energy transfer element. The switched mode power converter controller usually provides output regulation by sensing one or more inputs representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

One type of switch mode power converter is a resonant converter, which includes a resonant circuit (e.g., inductor(s) and capacitor(s)) as part of a power stage. A resonant circuit may advantageously enhance power conversion efficiency by availing zero-current and/or zero-voltage switching.

A subset of resonant converters, the series inductor-inductor capacitor (LLC) converter, uses a resonant circuit with two inductors and one capacitor connected in series to form an LLC resonant circuit. Commonly, the power stage of an LLC converter is controlled so that power stage switches undergo zero-voltage switching.

BRIEF DESCRIPTION OF THE DRAWINGS

Non-limiting and non-exhaustive embodiments for control of a resonant converter using switch paths during power-up are described with reference to the following figures, wherein like reference numerals refer to like parts throughout the various views unless otherwise specified.

Figure 1A:
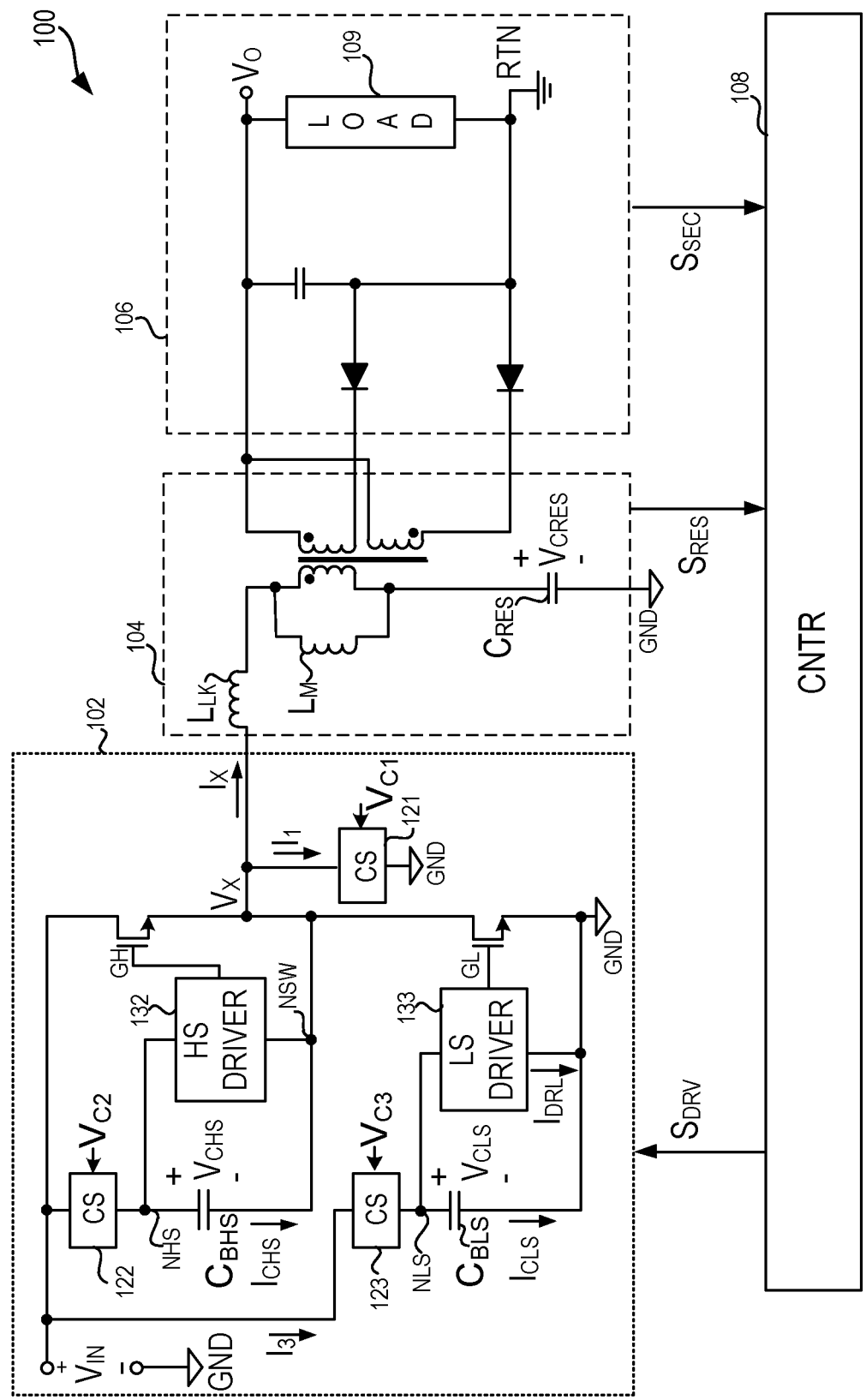
FIG. 1A illustrates a simplified schematic of an LLC converter according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the teachings herein.

DETAILED DESCRIPTION

In the following description, numerous specific details are set forth in order to provide a thorough understanding of control of a power converter using switch paths during power-up. It will be apparent, however, to one having ordinary skill in the art that the specific detail need not be employed to practice the teachings herein. In other instances, well-known materials, components, and/or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the teachings herein. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In the context of the present application, when a transistor is in an "off-state" or "off" the transistor blocks current and/or does not substantially conduct current. Conversely, when a transistor is in an "on-state" or "on" the transistor is able to substantially conduct current. By way of example, in one embodiment, a high-voltage transistor comprises an N-channel field-effect transistor (FET); the N-channel field-effect transistor (FET) may be a metal oxide semiconductor field effect transistor (MOSFET) with the high-voltage being supported between the first terminal, a drain, and the second terminal, a source. In another embodiment the field-effect transistor (FET) may be a junction field effect transistor (JFET), a depletion-mode device whereby transport is predominantly by majority carriers.

In some embodiments an integrated controller circuit may be used to drive a power switch when regulating energy provided to a load. Also, for purposes of this disclosure, "ground" or "ground potential" refers to a reference voltage or potential against which all other voltages or potentials of an electronic circuit or Integrated circuit (IC) are defined or measured.

As described above one type of switched mode power converter is a resonant converter which uses a resonant circuit, also referred to as a resonant network or "tank" circuit, having inductance(s) and capacitance(s) as part of the power conversion process. Resonant converters may have some advantages compared to non-resonant switched mode power converters, such as soft switching (e.g., zero-voltage switching), generally higher efficiency, lower losses at higher frequency operation, and lower harmonic content in switching waveforms. These in turn can reduce packaging and component costs by allowing the use of smaller magnetic elements and smaller electromagnetic interference (EMI) filters.

Resonant converters often include a half-bridge circuit. The half-bridge circuit may include a low-side device driven by a low-side driver and a high-side device driven by a high-side driver. Under steady state switching conditions (i.e., under steady state conditions), the high-side driver may use a high-side capacitor, often referred to as a bootstrap capacitor, to cyclically provide power to the high-side driver. Additionally, the low-side driver may use a low-side capacitor, referred to as a holding capacitor, to maintain power to the low-side driver.

As one of ordinary skill in the art may appreciate, bootstrap circuitry may be required to avail a bootstrap voltage to the bootstrap capacitor. For instance, power (i.e., charge) may be provided to a high-side driver and its bootstrap capacitor by using a switching bootstrap method. In the steady state (i.e., during steady state operating conditions), the switching bootstrap method may cyclically provide energy to the bootstrap capacitor in accordance with a steady state switching cycle. When the low-side device is on, charge may be replenished from a ground referenced power source, via a bootstrap device (e.g., a bootstrap diode and/or an FET).

The capacitance of the high-side capacitor and the capacitance of the low-side capacitor may be selected to assure sufficient power during steady state switching and also during light-load conditions. For instance, the capacitances may be selected to be larger than a minimum holding capacitance (e.g., one hundred nanofarads) to hold sufficient voltage and to provide sufficient power to the high-side driver and/or the low-side driver.

Resonant converters may also include a resonant network (i.e., a resonant circuit). For instance, a resonant converter may use a resonant network including two inductors and a resonant capacitor to form an LLC (inductor-inductor-capacitor) resonant converter. Moreover, the inductances and capacitance of the resonant network may be designed for a desired operating point, gain, and performance specification. Accordingly, the capacitance of the resonant capacitor may be constrained by design.

Successful transition to the steady state from power-up may further depend upon a ratio of the capacitance of the resonant capacitor to the capacitance of the high-side capacitor. For instance, during power-up, the high-side capacitor and the resonant capacitor may be electrically coupled in a circuit path; and a high-side voltage (i.e., a bootstrap voltage) across the high-side capacitor may be limited by virtue of a capacitive voltage divider formed by the high-side capacitor with the resonant capacitor. Traditionally, a solution to assuring sufficient bootstrap voltage is to limit the capacitance of the high-side capacitor relative to that of the resonant capacitor.

Unfortunately, it may be undesirable to limit the capacitance of the high-side capacitor. Accordingly, there is a need for a half-bridge circuit which can successfully power-up to the steady state regardless of the capacitance of the resonant capacitor. Moreover, there is a need for a half-bridge circuit which can successfully power-up to the steady state regardless of the ratio of the capacitance of the resonant capacitor with the capacitance of the high-side capacitor.

Additionally, as modern switching converters and modern LLC converters seek to operate at higher switching frequencies, there is a need to improve and enhance power-up and power-up sequencing. For instance, during power-up, there may be unbalanced, unknown conditions (e.g., internal and/or external initial conditions), which can give rise to damaging overstress, to damaging inrush currents, and/or to slow response time in reaching steady-state zero-voltage switching. Unfortunately, the goal to operate at higher frequency may lead to unbalanced initial conditions. Accordingly, there is also a need for a half-bridge circuit which can successfully power-up to the steady state without electrically overstressing components.

Control of a resonant power converter using switch paths during power-up is described herein. During power-up, a first switch path sinks current away from a resonant capacitor while a second switch path sources current to a high-side capacitor. In this way the high-side capacitor may predictably charge to sufficient bootstrap voltage to support steady state operation. Additionally, a third switch path may control current to a low-side capacitor.

According to the teachings herein, the switch paths may advantageously enhance an LLC converter's ability to achieve steady state and rapidly attain zero voltage switching by reducing the transient time required to reach steady state. Additionally, using switch paths may avail a controllable and repeatable power-up method to advantageously reduce stress (i.e., overcurrent and/or overvoltage stress) on the high-side driver and low-side driver.

FIG. 1A illustrates a schematic of an LLC converter 100 according to an embodiment. The LLC converter 100 includes a half-bridge circuit 102, a resonant network 104, a secondary network 106, and a controller 108. A direct current (dc) input voltage $V_{IN}$, referenced to ground GND, may be applied at a primary input of the LLC converter 100 as a source of input power. In the steady state the controller 108 may control the LLC converter 100 to convert input power into dc output power delivered to a load 109. For ease of presentation, the schematic of the LLC converter 100 has been simplified to provide a less obstructive view of switch paths 121-123.

As illustrated, the half-bridge circuit 102 includes a first switch path 121, a second switch path 122, and a third switch path 123. The first switch path 121 receives a control signal $V_{C1}$. The second switch path 122 receives a control signal $V_{C2}$; and the third switch path 123 receives a control signal $V_{C3}$. As described herein, the switch paths 121-123 may be controlled by their respective control signals $V_{C1}$-$V_{C3}$ to assure transition to the steady state from power-up (i.e., from a power-up state).

In the steady state (i.e., during steady state switching conditions) the LLC converter 100 may regulate the dc output power delivered to a load 109. The dc output power may be delivered to the load 109 with a regulated output voltage $V_O$ relative to a secondary ground RTN. Also, during the steady state, the controller 108 may provide a primary drive signal $S_{DRV}$ to the half-bridge circuit 102. Moreover, the primary drive signal $S_{DRV}$ may be provided in response to a secondary signal $S_{SEC}$ and/or a resonant network signal $S_{RES}$ to regulate dc output power delivered to the load 109.

As illustrated, the half-bridge circuit 102 includes a high-side capacitor $C_{BHS}$ and a low-side capacitor $C_{BLS}$; and the resonant network 104 includes a leakage inductor $L_{LK}$, magnetizing inductor $L_M$, and resonant capacitor $C_{RES}$. Also as illustrated, the high-side capacitor $C_{BHS}$, low-side capacitor $C_{BLS}$, and resonant capacitor $C_{RES}$ may operate with voltages $V_{CHS}$, $V_{CLS}$, and $V_{CRES}$, respectively. The high-side capacitor $C_{BHS}$ may also be referred to as a bootstrap capacitor $C_{BHS}$; and voltage $V_{CHS}$ may be referred to as bootstrap voltage $V_{CHS}$. Similarly, the low-side capacitor $C_{BLS}$ may also be referred to as a low-side holding capacitor $C_{BLS}$; and voltage $V_{CLS}$ may be referred to as low-side holding voltage $V_{CLS}$.

As one of ordinary skill in the art may appreciate, a resonant tank frequency may be determined, at least in part, by the capacitance of the resonant capacitor $C_{RES}$ with the inductance of the leakage inductor $L_{LK}$ and/or the magnetizing inductor $L_M$. In the steady state, a current $I_X$ may be provided to the resonant network 104 as an alternating current having a frequency commensurate with that of the resonant tank frequency; and the voltage $V_{CRES}$ may vary in proportion to the current $I_X$.

Also as illustrated, half-bridge circuit 102 includes a high-side driver 132 and a low-side driver 133. The high-side driver 132 is electrically coupled to a first terminal of the high-side capacitor $C_{BHS}$ at a high-side node NHS, and further coupled to a second terminal of the high-side capacitor $C_{BHS}$ at a half-bridge switch node NSW. When sufficient voltage $V_{CHS}$ (e.g. ten volts) is available from the high-side capacitor $C_{BHS}$, the high-side driver 132 may provide a gate signal GH. The low-side driver 133 is electrically coupled to a first terminal of the low-side capacitor $C_{BLS}$ at a low-side node NLS, and further coupled to a second terminal of the low-side capacitor $C_{BLS}$ at ground GND. When sufficient voltage $V_{CLS}$ (e.g. ten volts) is available from the low-side capacitor $C_{BLS}$, the low-side driver 133 may provide a gate signal GL.

During power-up (i.e., in the power-up state), the voltages $V_{CHS}$ and $V_{CLS}$ may have transient values (i.e., transient voltage levels) whereby the high-side driver 132 and/or the low-side driver 133 do not have sufficient power (i.e., voltage and/or energy) to provide adequate gate signals GH, GL. According to the teachings herein, the first switch path 121 may shunt (i.e., sink) current $I_1$ away from the resonant capacitor $C_{RES}$ while second switch path 122 provides (i.e., sources) current $I_{CHS}$ to the high-side capacitor $C_{BHS}$. For instance, the first switch path 121 may divert current $I_1$ to enhance (i.e., to augment) current $I_{CHS}$. In this manner the aforementioned capacitive voltage divider, formed by the high-side capacitor $C_{BHS}$ with the resonant capacitor $C_{RES}$, may be substantially eliminated during power-up. Consequently, during power-up, the high-side capacitor $C_{BHS}$ may be advantageously charged (i.e., augmented) to a voltage $V_{CHS}$ (i.e., bootstrap voltage $V_{CHS}$) adequate for powering the high-side driver 132.

Additionally, the third switch path 123 may provide (i.e., source) current $I_{CLS}$ to the low-side capacitor $C_{BLS}$ so that the low-side holding voltage $V_{CLS}$ reaches a steady state value in a controlled manner.

Alternatively, and additionally, the third switch path 123 may provide current $I_{CLS}$ to the low-side capacitor $C_{BLS}$ as a function of the low-side holding voltage $V_{CLS}$. As discussed below with respect to FIG. 5, the third switch path 123 may limit and/or control current $I_3$ to follow a function of the low-side holding voltage $V_{CLS}$. Controlling current $I_3$ as a function of holding voltage $V_{CLS}$ may advantageously reduce thermal stress and/or thermal failures due to faults (e.g., a short-circuit fault).

As mentioned above, the schematic of the LLC converter 109 is a non-limiting embodiment simplified to provide a less obstructive view of switch paths 121-123. For instance, the controller 108 has been simplified to show only three signals, namely, the primary drive signal $S_{DRV}$, the secondary signal $S_{SEC}$, and the resonant network signal $S_{RES}$. As one of ordinary skill in the art may appreciate, the half-bridge circuit 102 may be used in other converter architectures including inductor-capacitor-capacitor (LCC) resonant converters and/or various non-resonant converters. As one of ordinary skill in the art may appreciate, controller 108 may exert control with greater or fewer than three signals; and other configurations are possible.

Figure 1B:
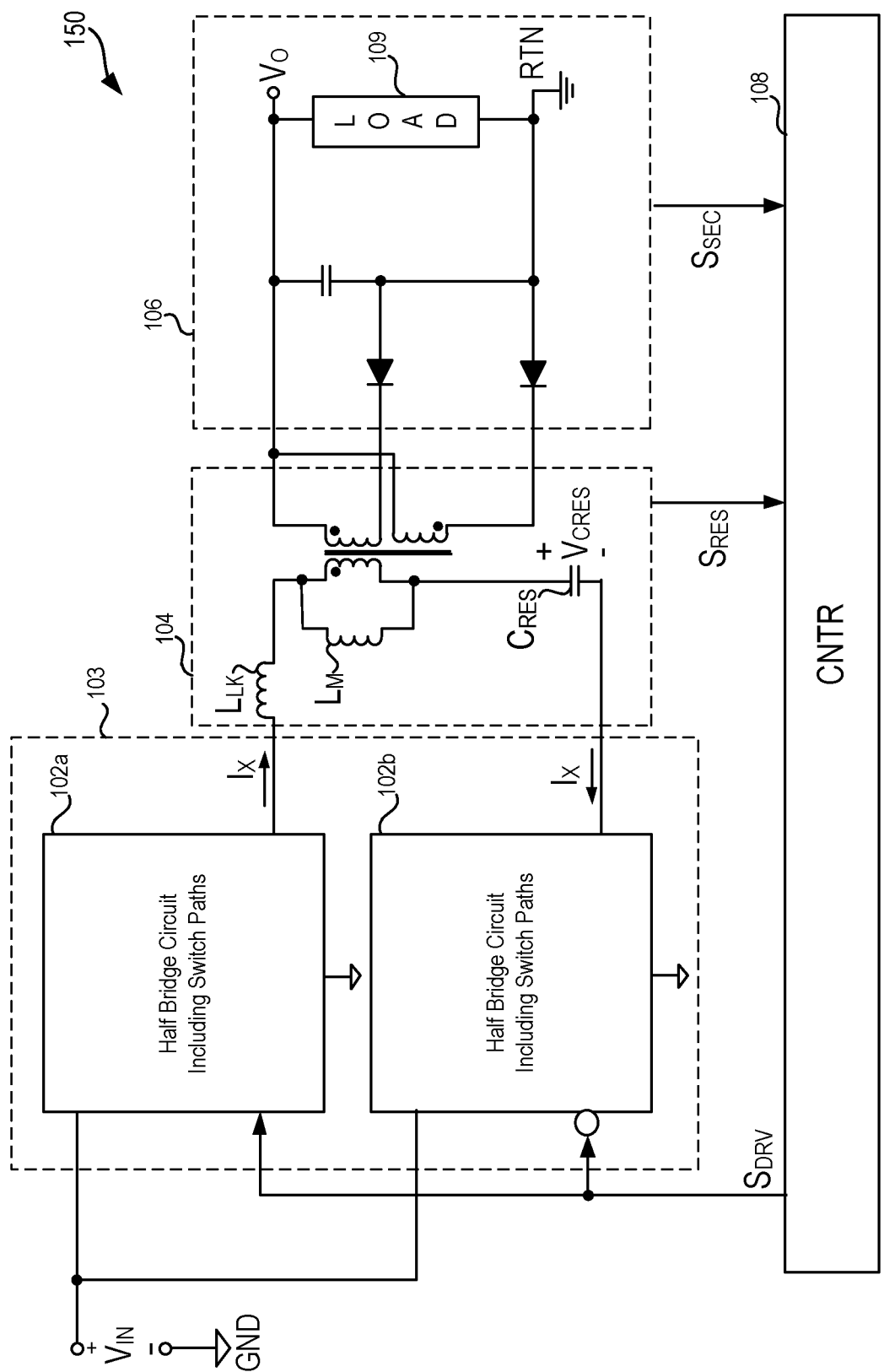
FIG. 1B illustrates a simplified schematic of an LLC converter according to another embodiment.

For instance, FIG. 1B illustrates a simplified schematic of an LLC converter 150 according to another embodiment. The LLC converter 150 is similar to LLC converter 100, except the half-bridge circuit 102 is replaced with a full-bridge circuit 103. The full-bridge circuit 103 includes half-bridge circuits 102a-102b. The half-bridge circuits 102a-102b may be similar to half-bridge circuit 102 and may each include switch paths (e.g., switch paths 121-123).

As one of ordinary skill in the art may appreciate, the LLC converter 150 is connected in a full-bridge configuration whereby the resonant network 104 is electrically coupled between the half-bridge circuits 102a-102b. As illustrated, in a full-bridge configuration current Ix is provided to the resonant network 104 from half-bridge circuit 102a; and current Ix is provided from the resonant network 104 to the half-bridge circuit 102b.

Figure 2A:
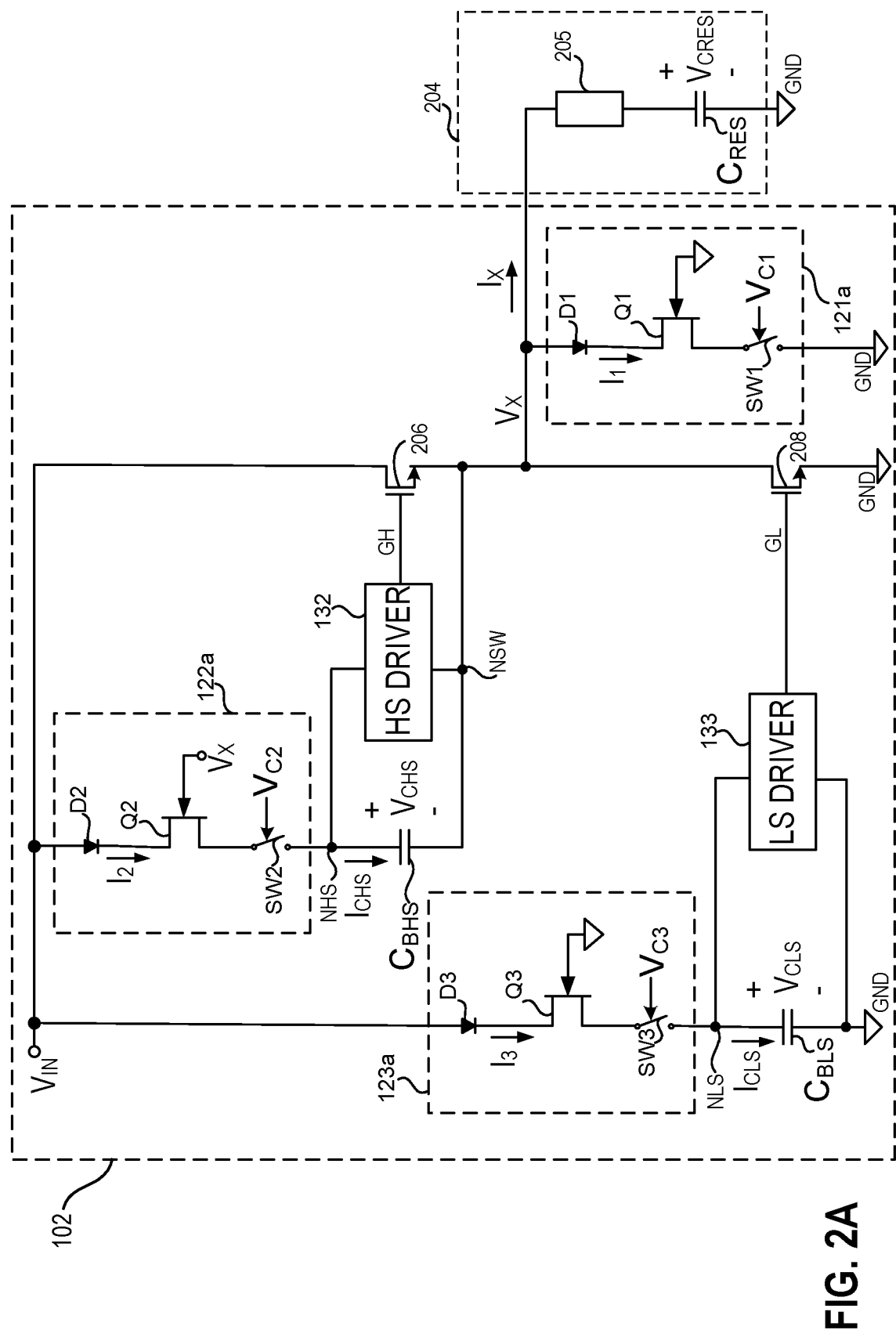
FIG. 2A is a schematic of a half-bridge circuit including switch paths according to a first embodiment.

FIG. 2A is a schematic of a half-bridge circuit 102 including switch paths 121a-123a according to a first embodiment. Additionally, the half-bridge circuit 102 includes the high-side capacitor $C_{BHS}$, high-side driver 132, high-side device 206, low-side capacitor $C_{BLS}$, low-side driver 133, and low-side device 208. The high-side device 206 and the low-side device 208 may operate as switches; and as illustrated, high-side device 206 and low-side device 208 may be realized with N-channel field effect transistors (FETs). Accordingly, high-side (HS) device 206 may also be referred to as high-side FET 206, and low-side (LS) device 208 may also be referred to as low-side FET 208.

The high-side driver 132 receives power (i.e., energy) from the high-side capacitor $C_{BHS}$, and can provide a gate signal GH (i.e., gate voltage GH) to the gate of the high-side FET 206. Additionally, the low-side driver 133 receives power (i.e., energy) from the low-side capacitor $C_{BLS}$, and can provide a gate signal GL (i.e., gate voltage GL) to the gate of the low-side FET 208. As described above the gate signals GL, GH can be voltages. Accordingly, the gate signal GH may also be referred to as gate voltage GH, and the gate signal GL may also be referred to as gate voltage GL.

Also illustrated is a resonant network 204 electrically coupled to the half-bridge circuit 102. The resonant network 204 includes the resonant capacitor $C_{RES}$ and lumped impedance 205. According to an embodiment, a capacitance of the resonant capacitor $C_{RES}$ may represent all capacitance of the resonant tank (e.g., resonant network 204), which may comprise parasitic capacitance and/or external capacitance. Additionally, a capacitance of the resonant capacitor $C_{RES}$ may form a capacitive divider with high-side capacitor $C_{BHS}$; as discussed above, a capacitive divider may reduce the available bootstrap voltage $V_{CHS}$. According to the teachings herein, during power-up, the switch paths 121a-122a may be used to allow the high-side capacitor $C_{BHS}$ to reach a sufficient (i.e., a sufficiently large) bootstrap voltage $V_{CHS}$ to power the high-side driver 132.

Additionally, during power-up, the third switch path 123a may be used to control current $I_{CLS}$ to the low-side capacitor $C_{BLS}$; and although the teachings are discussed with regards to a half-bridge circuit 102 driving a resonant network 204, other networks and configurations are possible. For instance, the resonant network 204 may be representative of any network receiving power (e.g., a current Ix) from a half-bridge circuit 102 and having an impedance with a series capacitive element similar to that of resonant capacitor $C_{RES}$.

The high-side driver 132 receives power (i.e., energy) from the high-side capacitor $C_{BHS}$, and can provide a gate signal GH (i.e., gate voltage GH) to the gate of the high-side FET 206. Additionally, the low-side driver 133 receives power (i.e., energy) from the low-side capacitor $C_{BLS}$, and can provide a gate signal GL (i.e., gate voltage GL) to the gate of the low-side FET 208. As described above the gate signals GL, GH can be voltages. Accordingly, the gate signal GH may also be referred to as gate voltage GH, and the gate signal GL may also be referred to as gate voltage GL.

The high-side FET 206 and the low-side FET 208 are electrically connected as a half-bridge to provide half-bridge voltage $V_X$ from the half-bridge switch node NSW. As illustrated, the source of the high-side FET 206 and the drain of the low-side FET 208 are electrically connected together at the half-bridge switch node NSW.

In the steady state the half-bridge voltage $V_X$ may be provided as a switching waveform (e.g., a square-wave switching waveform). The steady state switching waveform may transition between a maximum voltage provided by the source of the high-side FET 206 and a minimum voltage provided by the drain of the low-side FET 208.

As illustrated the half-bridge circuit 102 is electrically coupled to the resonant network 204 by virtue of the drain of the low-side FET 208 and the source of the high-side FET 206. The dc input voltage $V_{IN}$ is provided to the drain of the high-side FET 206, and the source of the low-side FET 208 is electrically coupled to ground GND. During steady state the high-side FET 206 and the low-side FET 208 are switched to function as a half-bridge. Thus, for at least part of a steady state switching cycle, the high-side FET 206 may be on concurrent with the low-side FET 206 being off; alternatively, the low-side FET 206 may be off concurrent with the high-side FET 208 being on. Accordingly, the maximum voltage provided by the high-side FET 206 may be substantially equal to the input voltage $V_{IN}$ when the high-side FET 206 receives sufficient gate voltage GH (i.e., sufficient gate-to-source voltage); and the minimum voltage provided by the low-side FET 208 may be substantially equal to ground GND when the low-side FET 208 receives sufficient gate voltage GL (i.e., sufficient gate-to-source voltage).

During power-up and prior to reaching the steady state, the low-side capacitor $C_{BLS}$ and the high-side capacitor $C_{BHS}$ may not have sufficient charge (i.e., energy). Therefore, the low-side driver 133 may not receive sufficient power (i.e., sufficient holding voltage $V_{CLS}$) from the low-side capacitor $C_{BLS}$ to provide a sufficient gate voltage GL; and the high-side driver 132 may not receive sufficient power (i.e., sufficient bootstrap voltage $V_{CHS}$) from the high-side capacitor $C_{BHS}$ to provide sufficient gate voltage GH. According to the teachings herein, switch paths 121a-123a may be controlled to predictably charge the low-side capacitor $C_{BLS}$ and the high-side capacitor $C_{BHS}$ during power-up (i.e., during the power-up state).

Switch paths 121a-123a comprise the first switch path 121a, second switch path 122a, and third switch path 123a. First switch path 121a includes a diode D1, N-channel junction field effect transistor (JFET) Q1, and switch SW1 electrically coupled in series. Similarly, second switch path 122a includes a diode D2, N-channel junction field effect transistor (JFET) Q2, and switch SW2 electrically coupled in series; and third switch path 123a includes a diode D3, N-channel junction field effect transistor (JFET) Q3, and switch SW3 electrically coupled in series. In some embodiments diode D3 may be optionally excluded from the third switch path 123a.

As one of ordinary skill in the art may appreciate, the JFETs Q1-Q3 may be realized as integrated and/or discrete JFETs Q1-Q3. In other embodiments, the JFETs Q1-Q3 may be realized with tap elements as disclosed by U.S. Pat. No. 6,865,093 B2 to Donald R. Disney. In this regard the switch paths 121a-123a may also referred to as tap paths 121a-123a; and the currents $I_1$-$I_3$ may also be referred to as tap currents $I_1$-$I_3$.

First switch path 121a may be configured to block and conduct current $I_1$ in response to control signal $V_{C1}$. For instance, switch SW1 may be opened and closed by control signal $V_{C1}$, whereby switch SW1 conducts current $I_1$ when closed, and blocks current $I_1$ when opened. First switch path 121a may also block and conduct current by virtue of diode D1. As illustrated, diode D1 may block current $I_1$ under reverse bias conditions and conduct current $I_1$ under forward bias conditions. In this manner current $I_1$ may flow when diode D1 is forward biased and may be blocked when diode D1 is reverse biased. In one embodiment, diode D1 may advantageously block a reverse substrate current.

Similarly, second switch path 122a may be configured to block and conduct current $I_2$ in response to control signal $V_{C2}$; and third switch path 123a may be configured to block and conduct current $I_3$ in response to control signal $V_{C3}$. For instance, switch SW2 may, in response to control signal $V_{C2}$, conduct current $I_2$ when closed and block current $I_2$ when opened; and switch SW3 may, in response to control signal $V_{C3}$, conduct current $I_3$ when closed and block current $I_3$ when opened. Additionally, diode D2 may block current $I_2$ under reverse bias conditions and conduct current $I_2$ under forward bias conditions; and in one embodiment diode D2 may advantageously block reverse substrate current. Diode D3 may block current $I_3$ under reverse bias conditions and conduct current $I_3$ under forward bias conditions. As indicated above, diode D3 may be optionally excluded from the third switch path 123a. For instance, in some embodiments the current $I_3$ may be dc current to ground thereby obviating the need for diode D3.

Additionally, first switch path 121a may be configured to limit current $I_1$. For instance, JFET Q1 may limit a maximum value of current $I_1$ by virtue of its operating point (e.g., gate to source voltage and drain to source voltage). As illustrated, the gate of JFET Q1 may be electrically coupled to ground GND (i.e., biased to ground potential). According to semiconductor device physics, JFET Q1 may limit current $I_1$ to have a substantially constant value when the operating point (e.g., drain-to-source voltage and gate-to-source voltage) causes the JFET Q1 to enter saturation (i.e., to enter its current saturation region).

Similarly, second switch path 122a may be configured to limit current $I_2$. For instance, JFET Q2 may limit a maximum value of current $I_2$ by virtue of its operating point. As illustrated, the gate of JFET Q2 may be biased at a half-bridge potential $V_X$. According to semiconductor device physics, JFET Q2 may limit current $I_2$ to have a substantially constant value when the operating point (e.g., drain-to-source voltage and gate-to-source voltage) causes the JFET Q2 to enter its current saturation region.

Also, third switch path 123a may be configured to limit current $I_3$. For instance, JFET Q3 may limit a maximum value of current $I_3$ by virtue of its operating point. As illustrated, the gate of JFET Q3 may be electrically coupled to ground GND (i.e., biased to ground potential). According to semiconductor device physics, JFET Q3 may limit current $I_3$ to have a substantially constant value when the operating point (e.g., drain-to-source voltage and gate-to-source voltage) causes the JFET Q3 to enter its current saturation region.

Additionally, third switch path 123a may be configured to limit current $I_3$ as a function of low-side holding voltage $V_{CLS}$. For instance, as discussed below with respect to FIG. 5, current $I_3$ may be controlled to be a staircase and/or step function of the holding voltage $V_{CLS}$. In this manner, current $I_{CLS}$, which varies in proportion to current $I_3$, also becomes limited as a function of holding voltage $V_{CLS}$.

As discussed above, during power-up, prior to the steady state, the low-side capacitor $C_{BLS}$ may initially not charge to adequate low-side holding voltage $V_{CLS}$; and the high-side capacitor $C_{BHS}$ (i.e., bootstrap capacitor $C_{BHS}$) may not receive adequate bootstrap voltage $V_{CHS}$. In turn, the low-side driver 133 may not receive sufficient power (i.e., holding voltage $V_{CLS}$) and the high-side driver 132 may not receive sufficient power (i.e., bootstrap voltage $V_{CHS}$); therefore, the high-side FET 206 and the low-side FET 208 may not receive adequate gate voltages GL, GH to be switched on and off during power-up.

As illustrated, the first switch path 121a may be electrically coupled to the drain of the low-side FET 208 to provide a parallel (i.e., shunt) circuit path to ground GND. During power-up (i.e., a power-up state), control signal $V_{C1}$ may be applied to the first switch path 121a to sink (i.e., shunt) current $I_1$ and to allow the half-bridge voltage $V_X$ to be pulled down. For instance, when the control signal $V_{C1}$ causes switch SW1 to close (i.e., to turn on), the half-bridge voltage $V_X$ may be pulled down to a voltage determined, at least in part, by an operating condition of the diode D1 and the JFET Q1.

The second switch path 122a, may be electrically coupled between the drain of the high-side FET 206 and the high-side capacitor $C_{BHS}$. During power-up, control signal $V_{C2}$ may be applied to the second switch path 122a to provide (i.e., to source) current $I_2$ to the high-side capacitor $C_{BHS}$. For instance, when the control signal $V_{C2}$ causes switch SW2 to close (i.e., to turn on), current $I_{CHS}$ may be provided to the high-side capacitor $C_{BHS}$. According to basic circuit theory, the current $I_{CHS}$ may be a component of the current $I_2$ sourced by the second switch path 122a.

The control signal $V_{C1}$ may be provided concurrent with control signal $V_{C2}$ so that the first switch path 121a sinks current $I_1$ (i.e., demands current $I_1$); while the second switch path 122a provides current $I_2$ (i.e., avails current $I_2$). The amount of current $I_{CHS}$ available to charge the high-side capacitor $C_{BHS}$, may depend, at least in part, upon the operating condition of the diode D2 and the JFET Q2. For instance, according to semiconductor device physics, the amount of current $I_2$ availed by the second switch path 122a may depend, at least in part, upon a saturation current of the JFET Q2.

Additionally, the operating conditions of the first switch path 121a and the second switch path 122a may be tailored so that the capacitor $C_{RES}$ does not interfere with the charging of the high-side capacitor $C_{BHS}$. For instance, JFET Q1 and JFET Q2 may be designed to operate with characteristic curves such that first switch path 121a demands more current $I_1$ than can be supplied by the second switch path 122a. Under these conditions, the first circuit path 121a may pull the half-bridge voltage $V_X$ down; this in turn may reduce (i.e., divert away) the current $I_X$ availed to the resonant capacitor $C_{RES}$. In this way, the resonant capacitor $C_{RES}$ is shunted by the first switch path 121a so that the resonant capacitor voltage $V_{CRES}$ is substantially reduced. Consequently, the current $I_{CHS}$ may charge the high-side capacitor $C_{BHS}$ to a sufficient bootstrap voltage $V_{CHS}$ without substantially charging the resonant capacitor $C_{RES}$. As discussed herein, the control signals $V_{C1}$ and $V_{C2}$ may be provided to regulate and/or limit the bootstrap voltage $V_{CHS}$ to a maximum (e.g., twelve volts).

Additionally, the third switch path 123a, may be electrically coupled between the drain of the high-side FET 206 and the low-side capacitor $C_{BLS}$. During power-up, control signal $V_{C3}$ may be applied to the third switch path 123a to provide (i.e., to source) current $I_3$ to the low-side capacitor $C_{BLS}$. According to basic circuit theory, the current $I_{CLS}$ may be a component of the current $I_3$ sourced by the third switch path 123a.

The control signal $V_{C3}$ may be provided so that the third switch path 123a sources and limits the current $I_3$ to protect the low-side capacitor $C_{BLS}$. The current $I_{CLS}$, provided to the low-side capacitor $C_{BLS}$, may depend at least in part, upon the operating condition of diode D3 and the JFET Q3. For instance, the amount of current may be limited by virtue of the operating conditions (e.g., characteristic curve) of JFET Q3. As discussed herein, the control signal $V_{C3}$ may be provided to regulate and/or limit the low-side holding voltage $V_{CLS}$ to a maximum (e.g., twelve volts).

Additionally, as described herein, the current $I_3$ may be a function of the low-side holding voltage $V_{CLS}$. As discussed below with regards to FIG. 5, current $I_3$, and consequently current $I_{CLS}$, may be controlled as a function of holding voltage $V_{CLS}$. In this way, components of third switch path 123a (e.g., JFET Q3), may be protected from short-circuit of holding voltage $V_{CLS}$ and/or thermal stress.

Figure 2B:
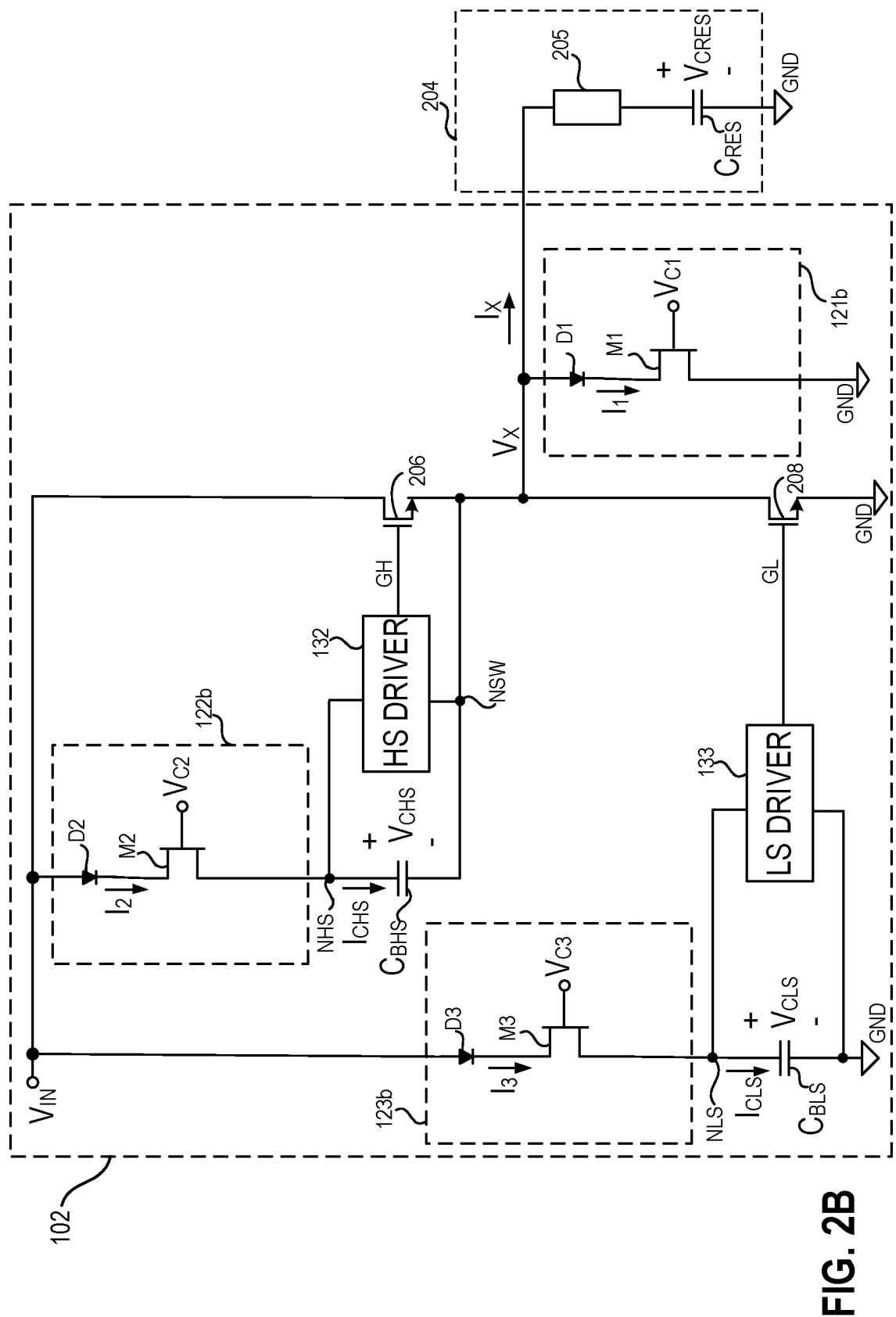
FIG. 2B is a schematic of a half-bridge circuit including switch paths according to a second embodiment.

FIG. 2B is a schematic of a half-bridge circuit 102 including switch paths 121b-123b according to a second embodiment. Half-bridge circuit 102 of FIG. 2B is similar to that of FIG. 2A, except the switch paths 121a-123a are replaced by switch paths 121b-123b. Switch paths 121b-123b comprise first switch path 121b, second switch path 122b, and third switch path 123b.

Similar to switch paths 121a-123a, switch paths 121b-123b may be used during power-up. Like switch paths 121a-122a, switch paths 121b-122b may be configured to assure high-side capacitor $C_{BHS}$ charges to an adequate bootstrap voltage $V_{CHS}$ by current $I_{CHS}$; and like third switch path 123a, third switch path 123b may be configured to limit the current $I_{CLS}$ and to prevent inrush to low-side holding capacitor $C_{BLS}$.

In contrast to switch paths 121a-123a, switch paths 121b-123b include N-channel field effect transistors (NFETs) M1-M3 instead of JFETs Q1-Q3 and switches SW1-SW3. As illustrated, first switch path 121b comprises diode D1 electrically coupled in series with NFET M1; the cathode of diode D1 may be electrically coupled to the drain of NFET M1. Second switch path 122b comprises diode D2 electrically coupled in series with NFET M2; the cathode of diode D2 may be electrically coupled to the drain of NFET M2. Third switch path 123b comprises diode D3 electrically coupled in series with NFET M3; the cathode of diode D3 may be electrically coupled to the drain of NFET M3.

Switch paths 121b-123b may provide similar electrical function as switch paths 121a-123a by virtue of the control signals $V_{C1}$-$V_{C3}$.

With regards to switch paths 121a-123a, the control signals $V_{C1}$-$V_{C3}$ may be provided to their respective switches SW1-SW3 to control switches SW1-SW3 to individually operate in the on-state or off-state. As discussed above, in switch paths 121a-123a, currents $I_1$-$I_3$ may be tailored (i.e., limited) by virtue of the operating conditions of JFETs Q1-Q3; as discussed above, the currents $I_1$-$I_3$ may be limited according to saturation characteristics and device operating points (e.g., applied gate-to-source voltage and/or applied drain-to-source voltage) of JFETs Q1-Q3.

With regards to switch paths 121b-123b, the control signals $V_{C1}$-$V_{C3}$ may be provided to (i.e., may drive) the gates of NFETs M1-M3. In this way the behavior of currents $I_1$-$I_3$ in switch paths 121b-123b may be similar to the behavior currents $I_1$-$I_3$ in switch paths 121a-123a.

For instance, control signal $V_{C1}$ may be provided to the gate of NFET M1 to turn NFET M1 off by forcing the gate-to-source voltage of NFET M1 to be less than a threshold voltage; alternatively, and additionally, control signal $V_{C1}$ may be provided to the gate of NFET M1 to force NFET M1 to operate in its saturation region based on a function of the magnitude of control signal $V_{C1}$. In this way the electrical behavior of first switch path 121b may be tailored to have similar electrical behavior (i.e., similar demand for current $I_1$) as first switch path 121a. Similarly, control signal $V_{C2}$ may be provided to the gate of NFET M2 so that second switch path 122b is tailored to have similar electrical behavior (i.e., similar supply of current $I_2$) as second switch path 122a; and control signal $V_{C3}$ may be provided to the gate of NFET M3 so that third switch path 123b is tailored to have similar electrical behavior (i.e., similar supply of current $I_3$) as third switch path 123a.

Figure 2C:
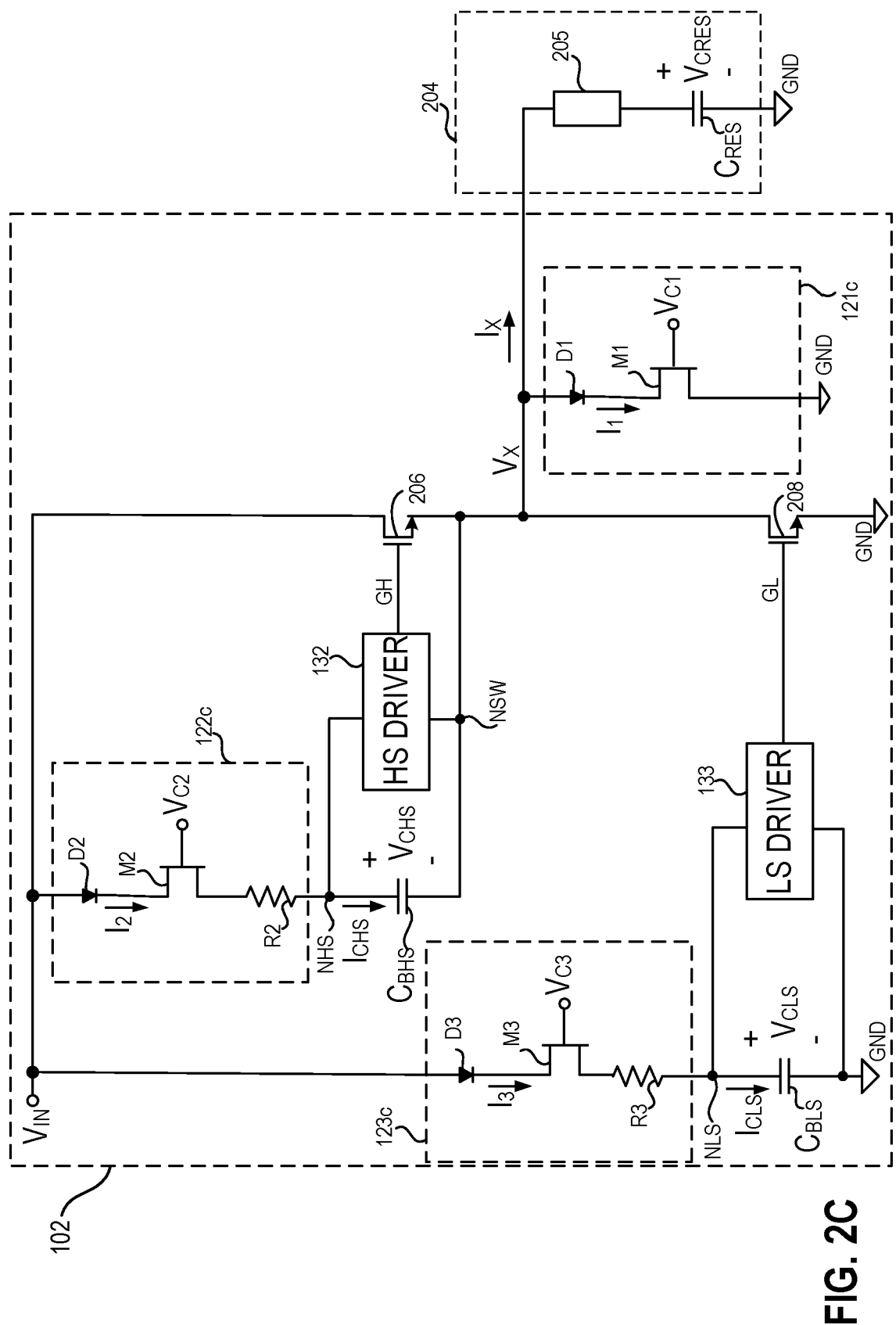
FIG. 2C is a schematic of a half-bridge circuit including switch paths according to a third embodiment.

FIG. 2C is a schematic of a half-bridge circuit 102 including switch paths 121c-123c according to a third embodiment. Half-bridge circuit 102 of FIG. 2C is similar to that of FIG. 2B, except the switch paths 121b-123b are replaced by switch paths 121c-123c. Switch paths 121c-123c comprise first switch path 121c, second switch path 122c, and third switch path 123c.

Similar to switch paths 121a-123a and to switch paths 121b-123b, switch paths 121c-123c may be used during power-up. Like switch paths 121a-122a and switch paths 121b-122b, switch paths 121c-122c may be configured to assure high-side capacitor $C_{BHS}$ charges to an adequate bootstrap voltage $V_{CHS}$ by current $I_{CHS}$; and like third switch path 123a and third switch path 123b, third switch path 123c may be configured to limit the current $I_{CLS}$ to reduce inrush to low-side holding capacitor $C_{BLS}$.

In contrast to switch paths 121b-123b, switch paths 121c-123c further include resistors R1-R3. As illustrated, first switch path 121c comprises diode D1 electrically coupled in series with NFET M1 and with resistor R1. Second switch path 122c comprises diode D2 electrically coupled in series with NFET M2 and with resistor R2; and third switch path 123c comprises diode D3 electrically coupled in series with NFET M3 and with resistor R3.

Resistors R1-R3 may advantageously provide an additional level and/or degree of freedom for current limit in switch paths 121c-123c. Additionally, using resistors R1-R3 to respectively limit currents $I_1$-$I_3$, may mitigate variability in process and/or operating conditions. For instance, in some embodiments there may be large variation (e.g., process variation) in the saturation characteristics of an NFET (e.g., NFET M1, NFET M2, and/or NFET M3) while there may be small variation in a resistance (e.g., sheet resistance) of a resistor (e.g., resistor R1, resistor R2, and/or resistor R3).

Figure 2D:
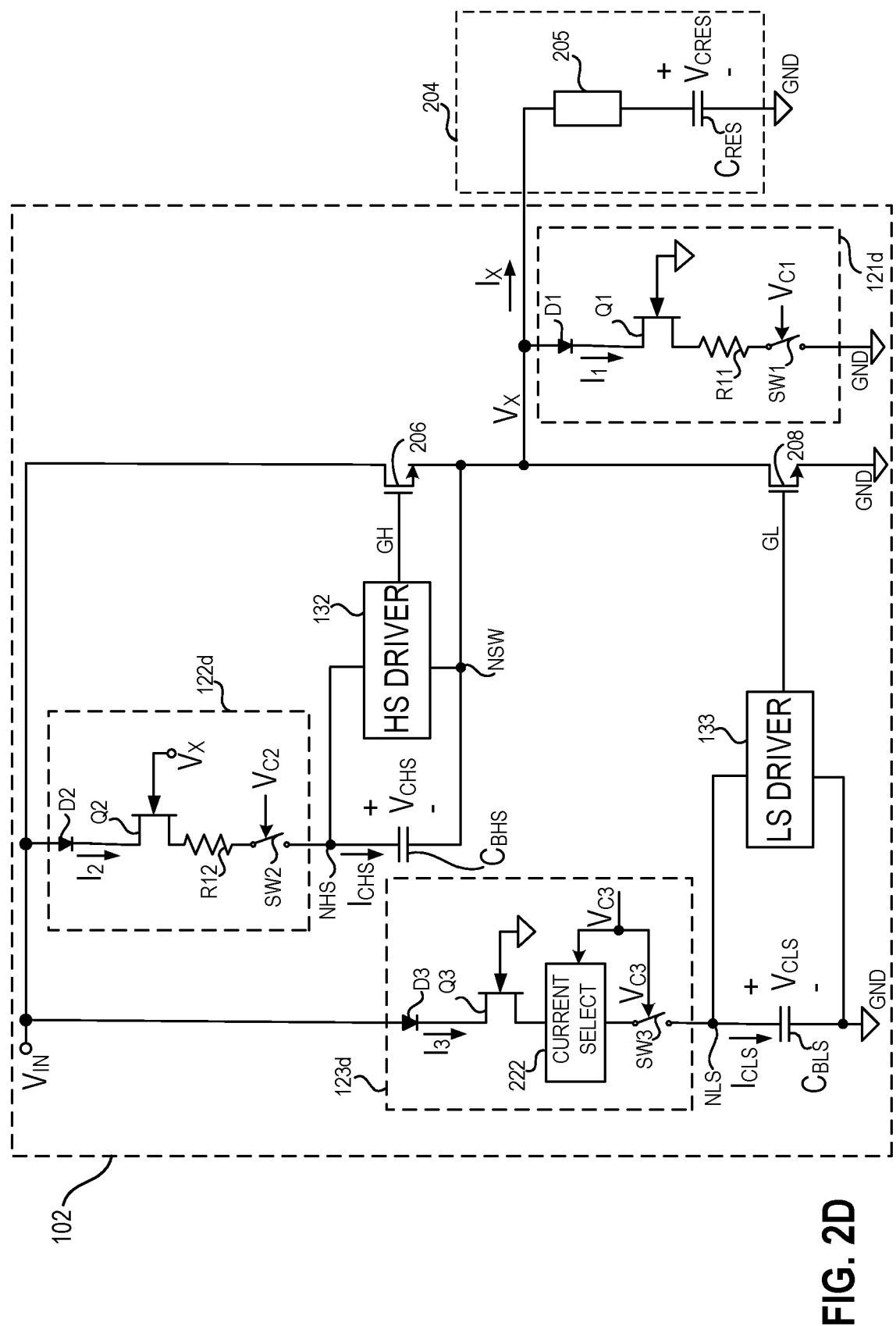
FIG. 2D is a schematic of a half-bridge circuit including switch paths according to a fourth embodiment.

FIG. 2D is a schematic of a half-bridge circuit 102 including switch paths 121d-123d according to a third embodiment. Half-bridge circuit 102 of FIG. 2D is similar to that of FIG. 2A, except the switch paths 121a-123a are replaced by switch paths 121d-123d. Switch paths 121d-123d comprise first switch path 121d, second switch path 122d, and third switch path 123d.

Similar to switch paths 121a-123a, switch paths 121b-123b, and switch paths 121c-123c, switch paths 121d-123d may be used during power-up. Switch paths 121d-122d may similarly be configured to assure high-side capacitor $C_{BHS}$ charges to an adequate bootstrap voltage $V_{CHS}$ by current $I_{CHS}$; and third switch path 123d may be configured to control current $I_{CLS}$.

In contrast to switch paths 121a-122a, switch paths 121d-122d further include resistors R11-R12. As illustrated, first switch path 121d comprises diode D1 electrically coupled in series with JFET Q1, with switch SW1, and with resistor R11; and second switch path 122d comprises diode D2 electrically coupled in series with JFET Q2, with switch SW2, and with resistor R12. The resistance of resistor R11 and the resistance of resistor R12 may be selected to assure that first switch path 121d demands more current $I_1$ than may be provided by second switch path 122d. For instance, in an embodiment, the resistance of resistor R12 may be greater than the resistance of resistor R11.

In contrast to third switch path 123a, third switch path 123d includes a current select element 222. As illustrated, first switch path 123d comprises diode D3 electrically coupled in series with JFET Q3, with switch SW3, and with control select element 222; also current select element 222 may receive control signal $V_{C3}$. In addition to controlling switch SW3 to conduct or block current $I_3$, control signal $V_{C3}$ may also vary the amount (e.g., amplitude) of current $I_3$. For instance, in one application current select element 222 may be a voltage controlled current source limiting current $I_3$ in proportion to control signal $V_{C3}$. Alternatively, and additionally, current select element 222 may comprise voltage controlled resistance limiting the current $I_3$ as a function of the control signal $V_{C3}$. Additionally, current select element 222 may include a switched resistor network availing discrete resistance values as a function of the control signal $V_{C3}$.

Figure 3A:
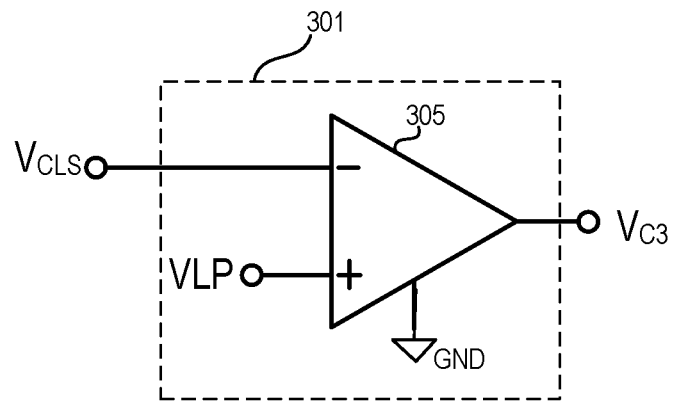
FIG. 3A illustrates a control circuit according to an embodiment.

FIG. 3A illustrates a control circuit 301 according to an embodiment. As illustrated, control circuit 301 includes a comparator 305. Comparator 305 may be referenced to ground GND and may receive the low-side holding voltage $V_{CLS}$ at its inverting input and a peak value VLP (e.g., a reference voltage VLP) at its noninverting input.

As illustrated, control circuit 301 may provide control signal $V_{C3}$ (i.e., the output of comparator 305) based on a comparison of the low-side holding voltage $V_{CLS}$ to the peak value VLP. For instance, when the low-side holding voltage $V_{CLS}$ is less than peak value VLP, control circuit 301 may exert control signal $V_{C3}$ to turn switch SW3 on and/or to drive the gate of NFET M3 high. Alternatively, when the low-side holding voltage $V_{CLS}$ is greater than the peak value VLP, the control circuit 301 may exert control signal $V_{C3}$ to turn switch SW3 off and/or to drive the gate of NFET M3 low.

In this manner, the control signal $V_{C3}$ may regulate the low-side holding voltage $V_{CLS}$. In one embodiment the low-side holding voltage $V_{CLS}$ may be regulated to a voltage between ten and twenty volts; and as one of ordinary skill in the art may appreciate, other configurations are possible. For instance, a scaled value of the low-side holding voltage $V_{CLS}$ may instead be compared with a peak value VLP.

Figure 3B:
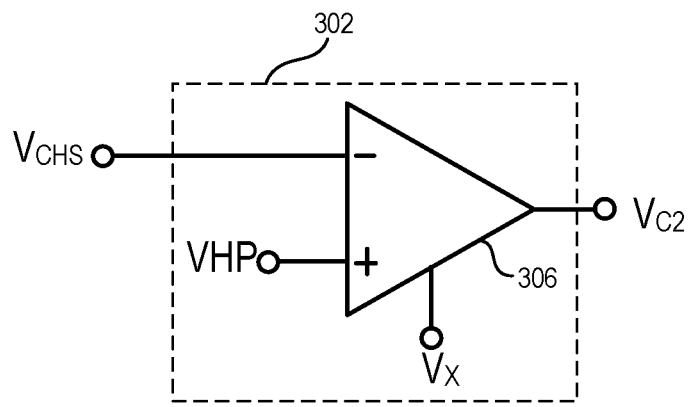
FIG. 3B illustrates a control circuit according to an embodiment.

FIG. 3B illustrates a control circuit 302 according to an embodiment. As illustrated, control circuit 302 includes comparator 306. Comparator 306 may be referenced to the half-bridge voltage $V_X$, instead of being referenced to ground GND. Comparator 306 may receive the bootstrap voltage $V_{CHS}$ at its inverting input and a peak value VHP at its noninverting input.

As illustrated, control circuit 302 may provide control signal $V_{C2}$ (i.e., the output of comparator 306) based on a comparison of the bootstrap voltage $V_{CHS}$ to the peak value VHP. For instance, when the bootstrap voltage $V_{CHS}$ is less than peak value VHP, control circuit 302 may exert control signal $V_{C2}$ to turn switch SW2 on and/or to drive the gate of NFET M2 high. Alternatively, when the bootstrap voltage $V_{CHS}$ is greater than the peak value VHP, the control circuit 302 may exert control signal $V_{C2}$ to turn switch SW2 off and/or to drive the gate of NFET M2 low.

In this manner, the control signal $V_{C2}$ may regulate the bootstrap voltage $V_{CHS}$. In one embodiment the bootstrap voltage $V_{CHS}$ may be regulated to a voltage between ten and twenty volts; and as one of ordinary skill in the art may appreciate, other configurations are possible. For instance, a scaled value of the bootstrap voltage $V_{CHS}$ may instead be compared with the peak value VHP.

Figure 3C:
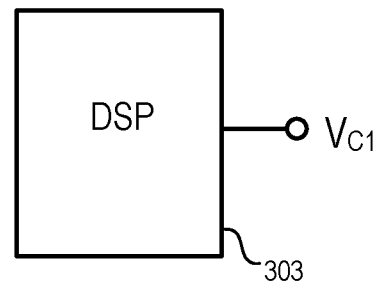
FIG. 3C illustrates a control circuit according to an embodiment.

FIG. 3C illustrates a control circuit 303 according to an embodiment. As illustrated, control circuit 303 may be a digital signal processor (DSP) control circuit 303 which provides control signal $V_{C1}$ as a function of system and/or state variables. For instance, control signal $V_{C1}$ may drive the gate of NFET M3 high, based upon an operating state (e.g., voltages and/or currents) of half-bridge circuit 102.

As presented in the above description, control circuits 301-303 are non-limiting embodiments presented for illustrative purposes. As one of ordinary skill in the art may appreciate, other configurations may be possible. For instance, as discussed below with regards to control circuit 311, one or more of control circuits 301-303 may provide control signals $V_{C1}$-$V_{C3}$ as a function of temperature (e.g., junction temperature). Additionally, one of more of the control signals $V_{C1}$-$V_{C3}$ may be provided with variable amplitude.

Figure 3D:
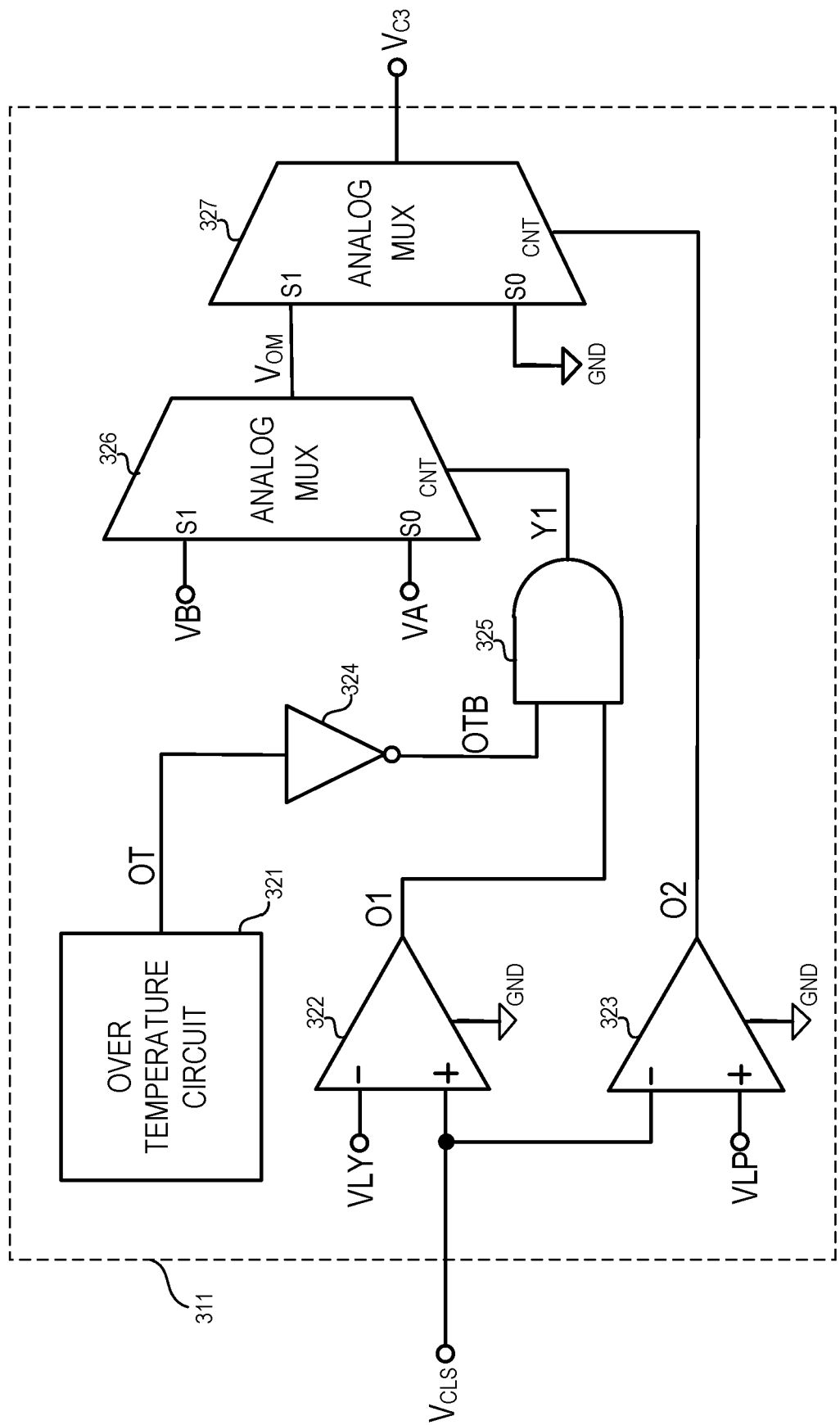
FIG. 3D illustrates a control circuit according to an embodiment.

FIG. 3D illustrates control circuit 311 for providing control signal $V_{C3}$ according to another embodiment. Control circuit 311 includes an over-temperature circuit 321, a comparator 322, a comparator 323, an inverter 324, an AND gate 325, an analog multiplexer 326, and analog multiplexer 327.

Over-temperature circuit 321 may provide a logic signal OT (e.g., a logic voltage OT) as a function of temperature (e.g., a device junction temperature). For instance, when temperature exceeds a threshold temperature (e.g., eighty-five degrees Centigrade) then logic signal OT may transition to a logic high value. As one of ordinary skill in the art may appreciate, there may be many ways to realize an over-temperature circuit 321 for determining when temperature has exceeded a threshold temperature.

As illustrated, comparator 322 may be referenced to ground GND and may receive the low-side holding voltage $V_{CLS}$ at its noninverting input and a threshold value VLY at its inverting input. As illustrated, comparator 322 may provide logic signal O1 in response to the low-side holding voltage $V_{CLS}$. As configured, logic signal O1 may transition high (i.e., from logic low to logic high) when the low-side holding voltage $V_{CLS}$ exceeds the threshold value VLY.

Comparator 323 may be referenced to ground GND and may receive the low-side holding voltage $V_{CLS}$ at its inverting input and a peak value VLP at its noninverting input. Comparator 322 may also provide logic signal O2 in response to the low-side holding voltage $V_{CLS}$. As configured, logic signal O2 may transition low (i.e., from logic high to logic low) when the low-side holding voltage $V_{CLS}$ exceeds the peak value VLP.

Also as illustrated, inverter 324 inverts logic signal OT to provide logic signal OTB (i.e., the logical NOT of logic signal OT). Additionally, AND gate 325 performs a logical AND of logic signal OTB and of logic signal O1 to provide logic signal Y1.

Analog multiplexer 326 receives logic signal Y1 at its control input CNT and analog signals VA, VB at its low-select and high-select inputs S0, S1, respectively. As one of ordinary skill in the art may appreciate, analog multiplexer 326 may function as an analog switch to provide analog signal $V_{OM}$ in response to logic signal Y1. As illustrated, analog multiplexer 326 may switch analog signal $V_{OM}$ to equal (i.e., to substantially equal) analog signal VA, when logic signal Y1 is low (i.e., a logic low). Conversely, analog multiplexer 326 may switch analog signal $V_{OM}$ to equal (i.e., to substantially equal) analog signal VB, when logic signal Y1 is high (i.e., a logic high).

Analog multiplexer 327 receives logic signal O2 at its control input CNT. Additionally, analog multiplexer 327 receives ground GND and analog signal $V_{OM}$ at its low-select and high-select inputs S0, S1, respectively. As one of ordinary skill in the art may appreciate, analog multiplexer 327 may function as an analog switch to provide control signal $V_{C3}$ in response to logic signal O2. As illustrated, analog multiplexer 327 may switch (i.e., may provide) control signal $V_{C3}$ to equal (i.e., to substantially equal) ground GND (i.e., logic low) when logic signal O2 is high. Conversely, analog multiplexer 327 may switch control signal $V_{C3}$ to equal (i.e., to substantially equal) analog signal $V_{OM}$ when logic signal O2 is low (i.e., a logic low).

With reference to switch path 123d, control circuit 311 may provide control signal $V_{C3}$ to avail voltage regulation and current limit. For instance, by virtue of comparator 323 and analog multiplexer 327, logic signal O2 may switch control signal $V_{C3}$ to ground (i.e., low) when low-side holding voltage $V_{CLS}$ exceeds the peak value VLP. Additionally, by virtue of analog multiplexers 326-327, logic signal O2 may switch control signal $V_{C3}$ to equal analog signal $V_{OM}$ when low-side holding voltage $V_{CLS}$ is less than the peak value VLP.

Also with reference to switch path 123d, control circuit 311 may avail current limit as a function of temperature. Additionally, current $I_3$ may be limited to a relatively low initial value (e.g., two milliamperes) until the low-side holding voltage $V_{CLS}$ reaches the threshold value VLY (e.g., seven volts). In one embodiment, reaching the threshold value VLY may indicate a safe operating condition absent of fault (e.g., a short-circuit fault). After the threshold value is exceeded, the current $I_3$ may be further increased to a larger value (e.g., ten milliamperes) availing increased current to the low-side driver 133 and to the low-side capacitor $C_{BLS}$.

According to embodiments of the teachings herein, the switch paths (i.e., switch paths 121-123, switch paths 121a-123a, switch paths 121b-123b, switch paths 121c-123c, and/or switch paths 121d-123d) may be functional during power-up (i.e., the power-up state); and upon reaching steady state (i.e., steady state switching conditions), the switch paths (e.g., switch paths 121-123) may be open circuit. For instance, upon reaching the steady state, the control circuits 301-303 may be configured to disable (i.e., to open circuit) switch paths (i.e., switch paths 121-123, switch paths 121a-123a, switch paths 121b-123b, switch paths 121c-123c, and/or switch paths 121d-123d). Thus, in the steady state, the control signals $V_{C1}$-$V_{C3}$ may be provided to turn off switches SW1-SW3 and/or to drive the gates of NFETs M1-M3 low. In the steady state, the high-side FET 206 and the low-side FET 208 may switch according to a steady state switching frequency; and conventional circuitry may be implemented (i.e., enabled) for recycling the bootstrap voltage $V_{CHS}$, and/or for providing the low-side holding voltage $V_{CLS}$.

Figure 4:
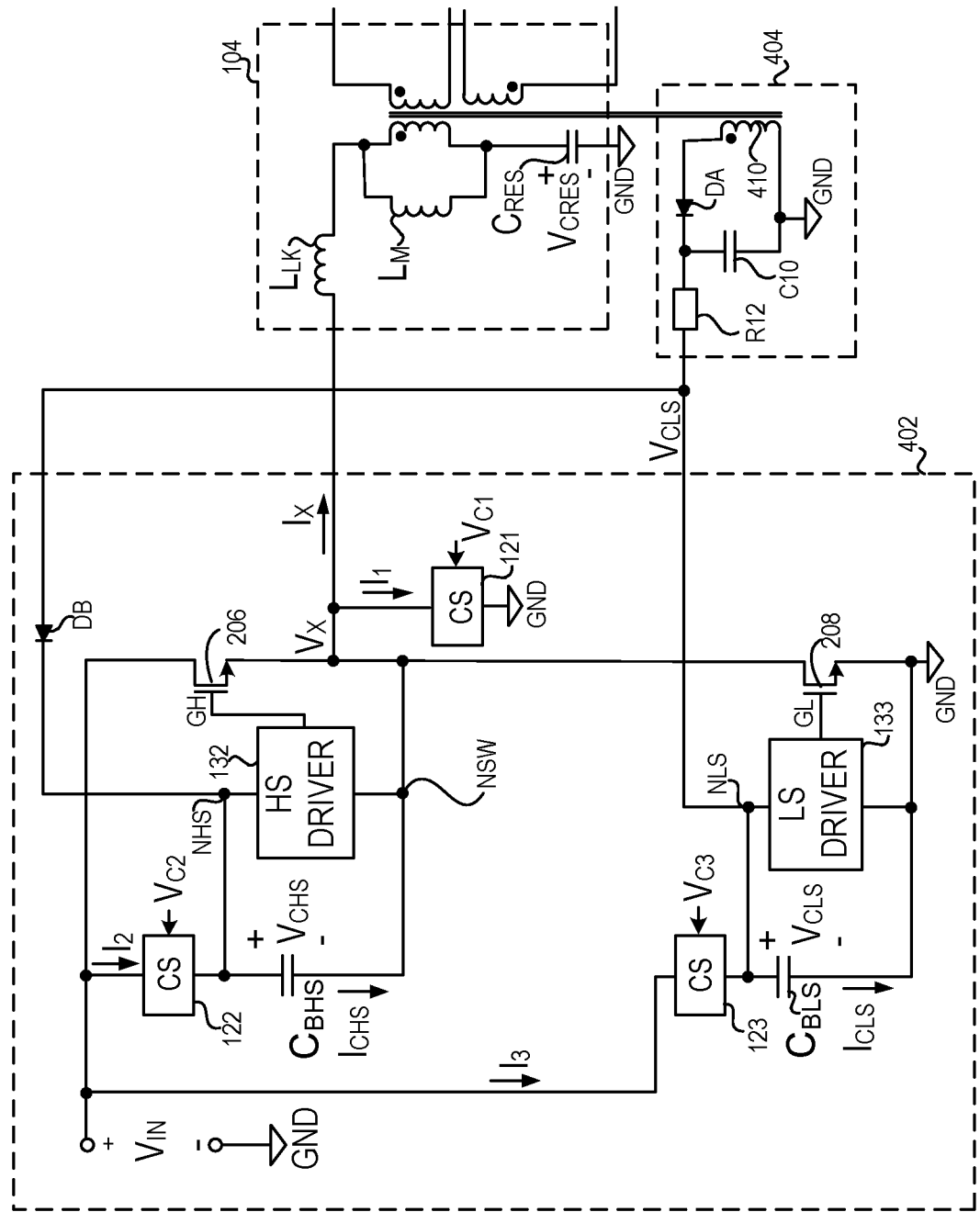
FIG. 4 illustrates a schematic of a half-bridge circuit according to an embodiment.

For instance, FIG. 4 illustrates a schematic of the half-bridge circuit 402 according to another embodiment. Half-bridge circuit 402 is similar to half-bridge circuit 102 except it includes a bootstrap diode DB. An anode of the bootstrap diode DB is electrically coupled to the low-side node NLS; and a cathode of the bootstrap diode DB is electrically coupled to the high-side node NHS. As discussed above, during steady state switching conditions (i.e., during steady state), switch paths 121-122 may be open circuit. Also, in the steady state, the bootstrap diode DB may recycle the bootstrap voltage $V_{CHS}$ in accordance with a switching waveform (e.g., a square wave) of the half-bridge voltage $V_X$ at the half-bridge switch node NSW.

Also illustrated by the schematic of the half-bridge circuit 402 is the resonant network 104 and an auxiliary supply 404. Auxiliary supply 404 includes a rectifier diode DA, an auxiliary winding 410, a decoupling capacitor C10, and a decoupling resistor R12. The auxiliary winding 410 is electrically connected between ground GND and an anode of the rectifier diode DA. A first terminal of the decoupling capacitor C10 is electrically connected to the cathode of the rectifier diode DA; and a second terminal of the decoupling capacitor C10 is electrically connected to ground GND. The decoupling resistor R12 is connected between the cathode of the rectifier diode DA and the low-side node NLS to provide low-side holding voltage $V_{CLS}$.

As discussed above, during steady state switching conditions (i.e., during steady state), switch path 123 may be open circuit. Also, in the steady state, the auxiliary supply 404 may provide low-side holding voltage $V_{CLS}$ (i.e., a dc rectified voltage $V_{CLS}$) to the low-side holding capacitor $C_{BLS}$.

Figure 5:
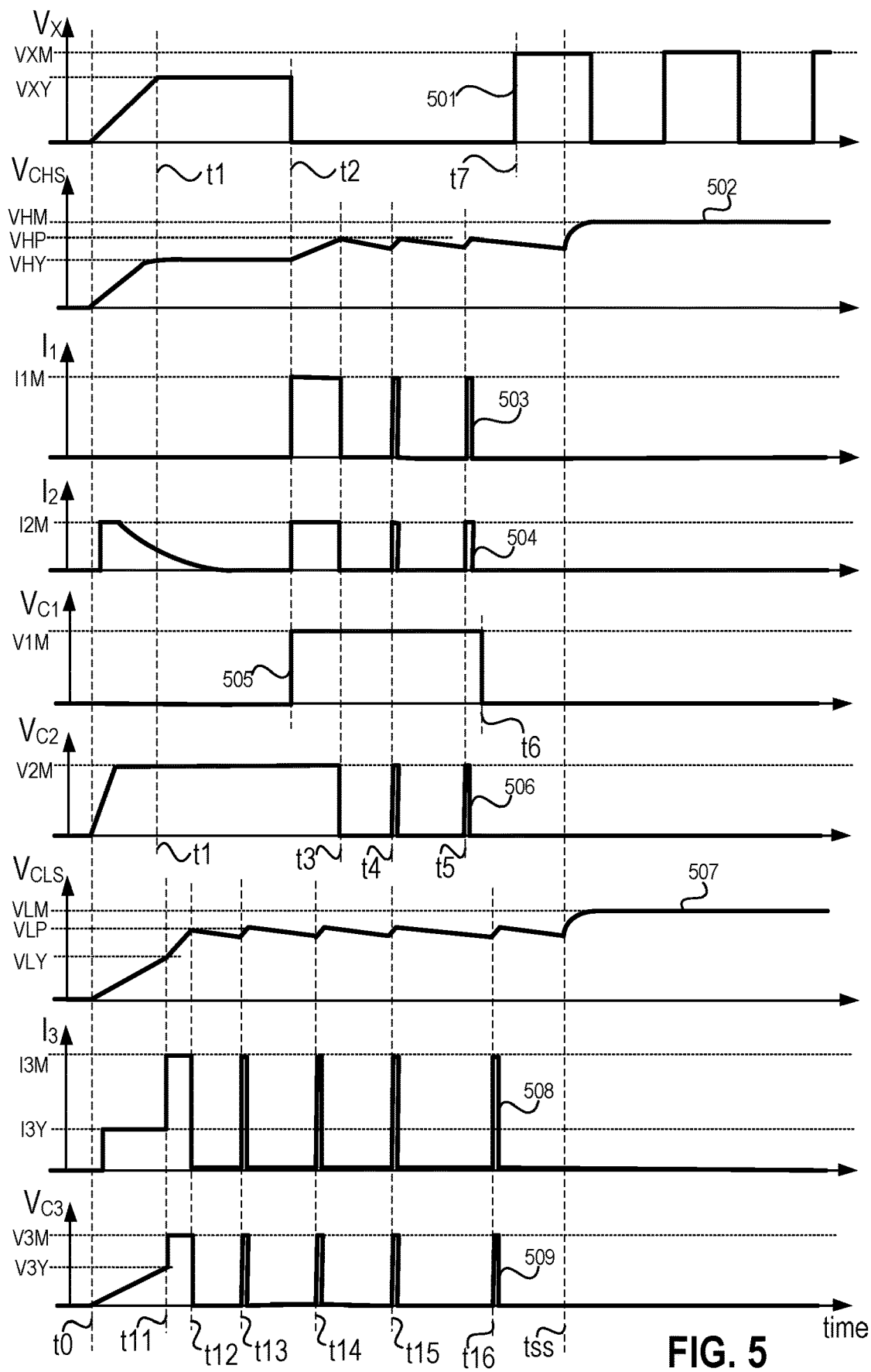
FIG. 5 illustrates waveforms according to an embodiment.

FIG. 5 illustrates waveforms 501-509 according to an embodiment. With reference to FIG. 4, waveform 501 may correspond with half-bridge voltage $V_X$. Waveform 502 may correspond with bootstrap voltage $V_{CHS}$. Waveforms 503 and 504 may correspond with currents $I_1$ and $I_2$, respectively. Waveforms 505 and 506 may correspond with control signals $V_{C1}$ and $V_{C2}$, respectively. Waveform 507 may correspond with low-side holding voltage $V_{CLS}$. Waveform 508 may correspond with current $I_3$; and waveform 509 may correspond with control signal $V_{C3}$.

Waveforms 501-509 are presented as a function of time. As illustrated, at time t0 power-up is initiated; and half-bridge circuit 402, resonant network 104, and auxiliary supply 404 may operate in a transient state (i.e., in a power-up state) between times t0 and tss. Following time tss, the half-bridge circuit 402, resonant network 104, and auxiliary supply 404 may transition to the steady state (i.e., operate in the steady state).

Additionally, and in accordance with the teachings herein, waveforms 505 and 506 may illustrate a method and/or sequence of providing control signals $V_{C1}$ and $V_{C2}$ to switch paths 121 and 122, respectively. For instance, control signal $V_{C1}$ may be provided by control circuit 303 based, at least in part, on state conditions including, but not limited to, a value of low-side holding voltage $V_{CLS}$ and/or a value of the bootstrap voltage $V_{CHS}$. Control signal $V_{C2}$ may be provided by control circuit 302; and as discussed above with regards to FIG. 3, control signal $V_{C2}$ may be provided relative to (i.e., referenced to) the half-bridge voltage $V_X$.

Between times t0 and t1 there may exist a circuit path including second switch path 122, high-side capacitor $C_{BHS}$, and resonant network 104. As illustrated by waveform 506, between times t0 and t1 control signal $V_{C2}$ may ramp (i.e., increase) to value V2M (e.g., five volts relative to the half-bridge voltage $V_X$). In response, second switch path 122 may conduct current $I_2$ by virtue of a switch (e.g., switch SW2) and/or NFET (e.g., NFET M2). For instance, as illustrated by waveform 504, between times t0 and t1 current $I_2$ increases to value I2M (e.g., two milliamperes).

Additionally, as illustrated by waveform 505, control signal $V_{C1}$ may be exerted low (e.g., ground and/or zero volts) by control circuit 303. Thus, first switch path 121 may block current $I_1$ by virtue of switch SW1 and/or NFET M1; and as illustrated by waveform 503, current I1 remains low (i.e., substantially equal to zero). Because first switch path 121 blocks current $I_1$, current $I_2$ may be provided to the resonant network 104 and may contribute to current $I_X$.

Accordingly, between times t0 and t1, half-bridge voltage $V_X$ may increase by virtue of a capacitive voltage divider formed by the high-side capacitor $C_{BHS}$ with the resonant capacitor $C_{RES}$; thus, waveform 501 (i.e., the half-bridge voltage $V_X$) may increase toward a value VXY. Concurrently, the bootstrap voltage $V_{CHS}$ may also increase by virtue of the capacitive voltage divider of the high-side capacitor $C_{BHS}$ with the resonant capacitor $C_{RES}$; and as illustrated by waveform 502, the bootstrap voltage $V_{CHS}$ may approach value VHY (e.g., seven volts).

Also, as illustrated by waveform 504, as half-bridge voltage $V_X$ approaches value VXY, current $I_2$ may decay in accordance with any impedance presented by the circuit path including second switch path 122, high-side capacitor $C_{BHS}$, and resonant network 104.

Value VXY may be determined, at least in part, by the input voltage $V_{IN}$ and by the bootstrap voltage $V_{CHS}$. For instance, according to circuit theory, value VXY may be substantially equal to the value of the input voltage $V_{IN}$ less the value of the bootstrap voltage $V_{CHS}$, and less any support voltage across second switch path 122. As discussed above, value VHY (e.g., seven volts) may be too low for steady state operation; and according to the teachings herein, switch paths 121 and 122 may be used to augment the bootstrap voltage $V_{CHS}$.

As illustrated by waveforms 501-506, between times t1 and t2 control signal $V_{C1}$ may continue to be exerted low; and control signal $V_{C2}$ may continue to be exerted high (i.e., to value V2M). Accordingly, the bootstrap voltage $V_{CHS}$ may continue to be limited to value VHY while the half-bridge voltage $V_X$ sustains value VXY. Also current $I_2$ may continue decaying towards zero (i.e., zero milliamperes) concurrent with current $I_1$ remaining at zero (i.e., zero milliamperes).

According to the teachings herein, at time t2 control signal $V_{C1}$ may be exerted high so that the first switch path 121 demands more current $I_1$ than may be provided by second switch path 122. For instance, at time t2 control circuit 303 may exert control signal $V_{C1}$ to value V1M (e.g., five volts) based on state conditions including, but not limited to, a value of the bootstrap voltage $V_{CHS}$ (e.g., value VHY) and/or a value of the half-bridge voltage $V_X$ (e.g., value VXY). Thus, as illustrated by waveform 501, at time t2 the first switch path 121 may pull the half-bridge voltage $V_X$ to a low voltage (e.g., zero volts).

As illustrated by waveforms 505 and 506, between times t2 and t3 control signal $V_{C1}$ may be exerted high to value V1M, and control signal $V_{C2}$ may be exerted high to value V2M. According to the teachings herein, the first switch path 121 may be configured to demand (i.e., sink) a larger current $I_1$ than can be supplied (i.e., sourced) by the second switch path 122.

As illustrated by waveform 502, the bootstrap voltage $V_{CHS}$ may increase to a peak value VHP (e.g., twelve volts) at time t3. In response, the control voltage $V_{C2}$ (i.e., waveform 506) may be exerted low by control circuit 302. From time t3 to time t6, the control signal $V_{C1}$ is exerted high; and the first switch path 121 and the second switch path 122 may maintain (i.e., regulate) the bootstrap voltage $V_{CHS}$ to peak value VHP by virtue of control circuit 302. For instance, as illustrated by waveforms 502-506, from times t3 through t6 the bootstrap voltage $V_{CHS}$ may be limited to peak value VHP in response to control circuit 302 changing states at times t4 and t5.

At time t6 control circuit 303 may exert control signal $V_{C1}$ low based on state conditions. For instance, control signal $V_{C1}$ may be exerted low at time t6 in response to the bootstrap voltage $V_{CHS}$ and/or the low-side holding voltage $V_{CLS}$ having reached adequate voltage levels. Additionally, upon reaching the steady state, control circuit 303 may continue to exert control signal $V_{C1}$ low in accordance with the teachings herein.

At time t7 the low-side driver 133 and high-side driver 132 may have adequate voltage for providing (i.e., driving) gate signals GL and GH. Accordingly, at time t7 the half-bridge voltage $V_X$ (i.e., waveform 501) begins switching to a higher value VXM. It may be appreciated that in the steady state, the value VXM may depend, at least in part, upon a steady state value of the low-side holding voltage $V_{CLS}$. Additionally, the value VXM may be greater than the value VXY. For instance, the value VXY may be seventy-five percent that of the value VXM.

Also in accordance with the teachings herein, waveform 509 may illustrate a method and/or sequence of providing control signal $V_{C3}$ to third switch path 123 (e.g., third switch path 123d). Control signal $V_{C3}$ may be provided by control circuit 301 and/or control circuit 311; additionally, the third switch path 123 (e.g., switch path 123d) may be configured to provide current $I_3$ as function of the low-side holding voltage $V_{CLS}$ (i.e., waveform 507). As discussed above, providing current $I_3$, and consequently current $I_{CLS}$, as a function of holding voltage $V_{CLS}$ may advantageously afford short circuit protection and/or thermal overload protection to components of the third switch path 123.

Between times t0 and t11 control signal $V_{C3}$ (i.e., waveform 509) increases to value V3Y (e.g., two volts); and low-side holding voltage $V_{CLS}$ (i.e., waveform 507) increases to threshold value VLY (e.g., seven volts). Between times t11 and t12 control signal $V_{C3}$ may, in response to the low-side holding voltage $V_{CLS}$ reaching threshold value VLY, transition to value V3M (e.g., five volts). Also, between times t11 and t12, low-side holding voltage $V_{CLS}$ may increase from threshold value VLY (e.g., seven volts) to peak value VLP (e.g., twelve volts).

According to the teachings herein, switch path 123 may provide current $I_3$ (i.e. waveform 508) as a function of the low-side holding voltage $V_{CLS}$. For instance, between times t0 and t11, while holding voltage $V_{CLS}$ is less than threshold value VLY, current $I_3$ may be limited to value I3Y (e.g., two milliamperes). For times greater than time t11, while holding voltage $V_{CLS}$ is greater than threshold value VLY and less than peak value VLP, current $I_3$ may be limited to value I3M (e.g., ten milliamperes). Thus, current I3 follows a staircase function of voltage $V_{CLS}$.

At time t12, in response to the holding voltage $V_{CLS}$ reaching its peak value VLP, control signal $V_{C3}$ may be exerted low by control circuit 301 and/or control circuit 311. From times t12 to time tss, the third switch path 123 may maintain (i.e., regulate) the low-side holding voltage $V_{CLS}$ to peak value VLP. For instance, as illustrated by waveforms 507-509, from times t12 through tss, the low-side holding voltage $V_{CLS}$ may be limited to peak value VLP in response to comparator 303 changing states at times t12-t16.

Following time tss, the half-bridge voltage Vx continues switching in the steady state; and according to the teachings herein, switch paths 121-123 may be configured to block currents $I_1$-$I_3$ (i.e., to be open circuit). In the steady state, auxiliary supply 404 may provide the low-side holding voltage $V_{CLS}$; and according to the switching cycle of waveform 501, the bootstrap diode DB may recycle the bootstrap voltage $V_{CHS}$.

For instance, as illustrated by waveform 507, at time tss the auxiliary supply 404 may provide the low-side holding voltage $V_{CLS}$ to reach a steady-state value VLM (e.g., eighteen volts). Because the steady-state value VLM is greater than the peak value VLP (i.e., the value limited by control circuit 301 and/or control circuit 311), the control signal $V_{C3}$ (i.e., waveform 509) is exerted low.

Similarly, bootstrap diode DB may recycle the bootstrap voltage $V_{CHS}$ (i.e., waveform 502) to reach a steady-state value VHM (e.g., eighteen volts relative to half-bridge voltage $V_X$). Because the steady-state value VHM is greater than the peak value VHP (i.e., the value limited by control circuit 302), control signal $V_{C2}$ (i.e., waveform 506) is also exerted low.

Although FIG. 5 shows waveforms 501-509 according to an embodiment of a half-bridge circuit (e.g., half-bridge circuit 402), other configurations and waveforms are possible. For instance, in another embodiment the second switch path 122 may be further configured to provide current $I_2$ as a function of the bootstrap voltage $V_{BHS}$. In this way, similar to third switch path 123, second switch path 122 may also avail thermal overload protection to its components (e.g., JFET Q2).

Figure 6A:
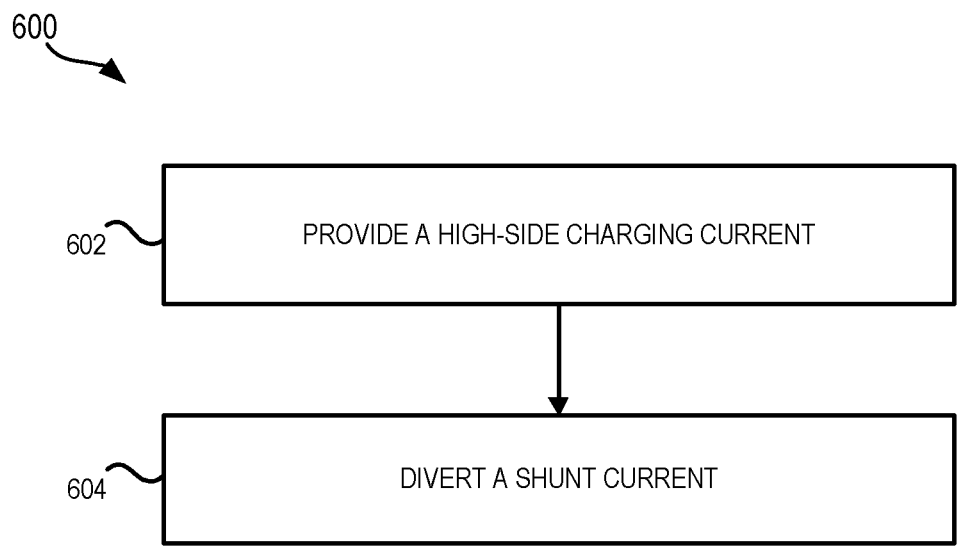
FIG. 6A illustrates a conceptual block diagram for operating a resonant converter during a power-up state according an embodiment.

FIG. 6A illustrates a conceptual block diagram 600 for operating a resonant converter (e.g., LLC converter 100) during a power-up state according an embodiment. The conceptual block diagram 600 includes element 602 and element 604. Element 602 comprises the concept of providing high-side charging current (i.e., current $I_2$ and/or current $I_{CHS}$); and element 604 comprises the concept of diverting a shunt current (i.e., current $I_1$). As described herein, during power-up, a first switch path (e.g., any one of first switch paths 121, 121a-c) may be configured to demand (i.e., sink) a current $I_1$. Concurrently, a second switch path (e.g., any one of second switch paths 122, 122a-c) may be configured to supply (i.e., source) a current $I_2$. According to the teachings herein, when the demand for current $I_1$ exceeds the supply of current $I_2$, then a current $I_{CHS}$ may adequately charge a bootstrap capacitor $C_{BHS}$ to supply a high-side driver 132 with ample bootstrap voltage $V_{CHS}$.

Figure 6B:
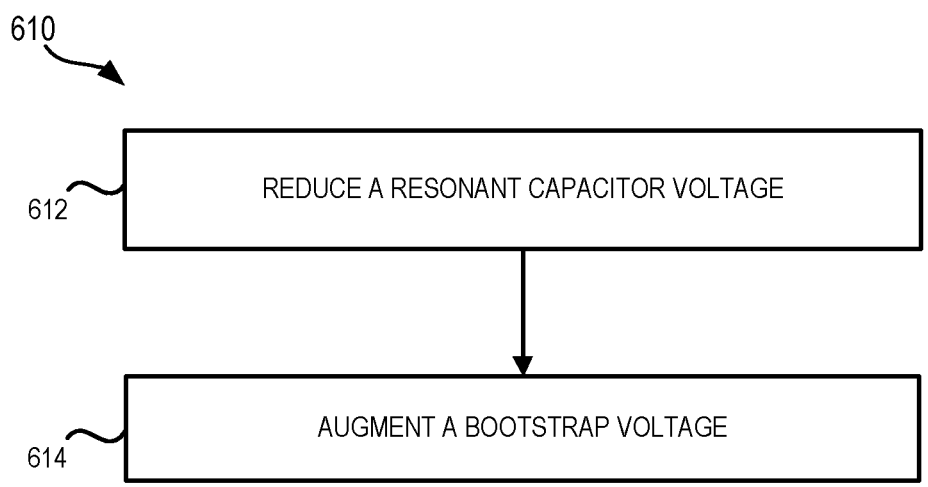
FIG. 6B illustrates a conceptual block diagram for operating a resonant converter during a power-up state according to the embodiment of FIG. 6A.

FIG. 6B illustrates a conceptual block diagram 610 for operating a resonant converter (e.g., LLC converter 100) during a power-up state according to the embodiment of FIG. 6A. The conceptual block diagram 610 includes element 612 and element 614.

Element 612 may correspond with an additional result of conceptual block diagram 600: namely, a resonant capacitor voltage (i.e., voltage $V_{RES}$) may be reduced in accordance with the teachings herein. Element 612 may further relate to a condition of conceptual block diagram 600: namely, the demand for current $I_1$ exceeds the supply of current $I_2$. According to the teachings herein, when the demand for current $I_1$ exceeds the supply of current $I_2$, resonant capacitor voltage $V_{CRES}$ may be reduced so that the capacitance of a resonant capacitor $C_{RES}$ does not interfere with the charging of the bootstrap capacitor $C_{BHS}$.

Element 614 may also correspond with an additional result of conceptual block diagram 600: namely, the bootstrap voltage $V_{CHS}$ may be augmented. According to the teachings herein, when the demand for current $I_1$ exceeds the supply of current $I_2$, a current $I_{CHS}$ may adequately charge a bootstrap capacitor $C_{BHS}$ to supply (i.e., to augment) a high-side driver 132 with ample bootstrap voltage $V_{CHS}$.

Although the conceptual block diagram 600 has been described with respect to a resonant converter (i.e., LLC converter 100), other switching converters are possible. For instance, as described above, the elements of conceptual block diagrams 600 and 610 may apply to other switching converters wherein a half-bridge circuit 102 is electrically coupled to a network having a capacitive element like that of resonant network 204. The teachings herein may, for instance, also apply to an LCC converter.

The above description of illustrated examples of the present disclosure, including what is described in the Abstract, are not intended to be exhaustive or to be limitation to the precise forms disclosed. While specific embodiments of, and examples for control of a power converter using switch paths during power-up are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings herein.

Although the present invention is defined in the claims, it should be understood that the present invention can alternatively be defined in accordance with the following examples.

Example 1: A half-bridge circuit (e.g., half-bridge circuit 102) is electrically coupled to a resonant network, the half-bridge circuit comprises: a high-side device, a low-side device, and a first switch path. The low-side device is electrically coupled to the high-side device. The first switch path is electrically coupled to the low-side device. For instance, the first switch path may be electrically coupled to the drain of the low-side device. During a power-up state (i.e., power-up), the first switch path is configured to divert a shunt current (e.g., current $I_1$) away from the resonant network.

Example 2: The half-bridge circuit of example 1, wherein the first switch path comprises a field effect transistor (e.g. JFET Q1 and/or NFET M1).

Example 3: The half-bridge circuit of example 2, wherein the field effect transistor is a junction field effect transistor (e.g., JFET Q1).

Example 4: The half-bridge circuit of any one of the preceding examples, wherein the first switch path comprises a diode (e.g., diode D1).

Example 5: The half-bridge circuit of any one of the preceding examples, wherein the first switch path comprises a switch (e.g., switch SW1).

Example 6: The half-bridge circuit of any one of the preceding examples, wherein during the power-up state the first switch path is configured to divert the shunt current so as to reduce a resonant capacitor voltage (e.g., voltage $V_{CRES}$).

Example 7: The half-bridge circuit of any one of the preceding examples, wherein during a steady state the first switch path is configured to be open circuit.

Example 8: The half-bridge circuit of any one of the preceding examples, further comprising: a high-side capacitor (i.e., bootstrap capacitor $C_{BHS}$) and a second switch path. The second switch path is configured to provide a high-side charging current (e.g., current $I_{CHS}$) to the high-side capacitor.

Example 9: The half-bridge circuit of any one of the preceding examples, wherein the high-side capacitor is configured to provide a high-side voltage (e.g., bootstrap voltage $V_{CHS}$), and wherein the first switch path is configured to divert the shunt current so as to augment the high-side voltage.

Example 10: The half-bridge circuit of any one of the preceding examples, wherein the second switch path is configured to provide the high-side charging current as a function of the high-side voltage.

Example 11: The half-bridge circuit of any one of the preceding examples, wherein the second switch path comprises a field effect transistor (e.g. JFET Q2 and/or NFET M2).

Example 12: The half-bridge circuit of any one of the preceding examples, wherein the field effect transistor is a junction field effect transistor (e.g., JFET Q2).

Example 13: The half-bridge circuit of any one of the preceding examples, wherein the second switch path comprises a diode (e.g., diode D2).

Example 14: The half-bridge circuit of any one of the preceding examples, wherein the second switch path comprises a switch (e.g., switch SW2).

Example 15: The half-bridge circuit of any one of the preceding examples, wherein during the power-up state the second switch path is configured to regulate the high-side voltage.

Example 16: The half-bridge circuit of any one of the preceding examples, wherein during a steady state the second switch path is configured to be open circuit.

Example 17: The half-bridge circuit of any one of the preceding examples, further comprising: a low-side holding capacitor (i.e., low-side capacitor $C_{BLS}$) and a third switch path. The third switch path is configured to provide a low-side charging current (i.e., current $I_{CLS}$) to the low-side holding capacitor.

Example 18: The half-bridge circuit of any one of the preceding examples, wherein the low-side holding capacitor is configured to provide a low-side holding voltage (i.e., voltage $V_{CLS}$).

Example 19: The half-bridge circuit of any one of the preceding examples, wherein the third switch path is configured to provide the low-side charging current as a function of the low-side holding voltage.

Example 20: The half-bridge circuit of any one of the preceding examples, wherein during the power-up state the third switch path is configured to regulate the low-side holding voltage.

Example 21: The half-bridge circuit of any one of the preceding examples, wherein the third switch path comprises a field effect transistor.

Example 22: The half-bridge circuit of example 19, wherein the field effect transistor is a junction field effect transistor (e.g., JFET Q3).

Example 23: The half-bridge circuit of any one of the preceding examples, wherein the third switch path comprises a diode (e.g., diode D3).

Example 24: The half-bridge circuit of any one of the preceding examples, wherein the third switch path comprises a switch (e.g., switch SW3).

Example 25: The half-bridge circuit of any one of the preceding examples, wherein during a steady state the third switch path is configured to be open circuit.

Example 26: A method of operating a resonant converter during a power-up state comprises: providing a high-side charging current to a high-side capacitor; and diverting a shunt current (e.g., current $I_1$) away from a resonant network.

Example 27: The method of any one of the preceding examples, wherein diverting the shunt current away from the resonant network comprises: reducing a resonant capacitor voltage.

Example 28: The method of any one of the preceding examples, further comprising: augmenting a high-side voltage of the high-side capacitor (i.e., element 614).

Example 29: The method of any one of the preceding examples, wherein providing the high-side charging current to the high-side capacitor comprises: regulating a high-side voltage.

Example 30: The method of any one of the preceding examples, wherein the high-side voltage is twelve volts.

Example 31: The method of any one of the preceding examples, further comprising: providing a low-side charging current to a low-side holding capacitor.

What is claimed is:

1. A half-bridge circuit electrically coupled to a resonant network, the half-bridge circuit comprising:
a high-side device;
a low-side device electrically coupled to the high-side device and configured to provide a half-bridge voltage;
a first switch path electrically coupled to the low-side device;
a high-side capacitor; and
a second switch path configured to provide a high-side charging current to the high-side capacitor,
wherein during a power-up state, the first switch path is configured to demand a shunt current, larger than the high-side charging current, and to divert the shunt current away from the resonant network, and
wherein during a steady state, the first switch path is configured to be open circuit while the half-bridge voltage continues switching.

2. The half-bridge circuit of claim 1, wherein the first switch path comprises a field effect transistor.

3. The half-bridge circuit of claim 2, wherein the field effect transistor is a junction field effect transistor.

4. The half-bridge circuit of claim 1, wherein the first switch path comprises a diode.

5. The half-bridge circuit of claim 1, wherein the first switch path comprises a switch.

6. The half-bridge circuit of claim 1, wherein during the power-up state the first switch path is configured to divert the shunt current so as to reduce a resonant capacitor voltage.

7. The half-bridge circuit of claim 1,
wherein the high-side capacitor is configured to provide a high-side voltage; and
wherein the first switch path is configured to divert the shunt current so as to augment the high-side voltage.

8. The half-bridge circuit of claim 7, wherein the second switch path is configured to provide the high-side charging current as a function of the high-side voltage.

9. The half-bridge circuit of claim 7, wherein the second switch path comprises a field effect transistor.

10. The half-bridge circuit of claim 9, wherein the field effect transistor is a junction field effect transistor.

11. The half-bridge circuit of claim 7, wherein the second switch path comprises a diode.

12. The half-bridge circuit of claim 7, wherein the second switch path comprises a switch.

13. The half-bridge circuit of claim 7, wherein during the power-up state the second switch path is configured to regulate the high-side voltage.

14. The half-bridge circuit of claim 7, wherein during a steady state the second switch path is configured to be open circuit.

15. The half-bridge circuit of claim 1, further comprising:
a low-side holding capacitor; and
a third switch path configured to provide a low-side charging current to the low-side holding capacitor.

16. The half-bridge circuit of claim 15, wherein the low-side holding capacitor is configured to provide a low-side holding voltage.

17. The half-bridge circuit of claim 16, wherein the third switch path is configured to provide the low-side charging current as a function of the low-side holding voltage.

18. The half-bridge circuit of claim 16, wherein during the power-up state the third switch path is configured to regulate the low-side holding voltage.

19. The half-bridge circuit of claim 15, wherein the third switch path comprises a field effect transistor.

20. The half-bridge circuit of claim 19, wherein the field effect transistor is a junction field effect transistor.

21. The half-bridge circuit of claim 15, wherein the third switch path comprises a diode.

22. The half-bridge circuit of claim 15, wherein the third switch path comprises a switch.

23. The half-bridge circuit of claim 15, wherein during a steady state the third switch path is configured to be open circuit.

24. A method of operating a resonant converter comprising:
during a power-up state, providing a high-side charging current to a high-side capacitor;
during the power-up state, demanding a shunt current larger than the high-side charging current;
during the power-up state, diverting the shunt current away from a resonant network; and during a steady state, switching a half bridge voltage according to a switching cycle while blocking the shunt current.

25. The method of claim 24, wherein during the power-up state, diverting the shunt current away from the resonant network comprises:
reducing a resonant capacitor voltage.

26. The method of claim 25, further comprising:
augmenting a high-side voltage of the high-side capacitor.

27. The method of claim 24, wherein during the power-up state, providing the high-side charging current to the high-side capacitor comprises:
regulating a high-side voltage.

28. The method of claim 27, wherein the high-side voltage is twelve volts.

29. The method of claim 24, further comprising:
providing a low-side charging current to a low-side holding capacitor.

* * * * *